United States Patent [19]

Ishikawa et al.

[11] Patent Number: 5,798,850
[45] Date of Patent: Aug. 25, 1998

[54] METHOD OF AND APPARATUS FOR DUPLICATING HOLOGRAM AND DUPLICATE HOLOGRAM

[75] Inventors: Toshiharu Ishikawa; Kenji Ueda; Satoru Hamada; Hiroyuki Nishimura, all of Tokyo, Japan

[73] Assignee: Dai Nippon Printing Co., Ltd., Tokyo, Japan

[21] Appl. No.: 747,746

[22] Filed: Nov. 12, 1996

Related U.S. Application Data

[63] Continuation of Ser. No. 297,053, Aug. 29, 1994, abandoned.

[30] Foreign Application Priority Data

| Aug. 27, 1993 | [JP] | Japan | 5-212954 |
| Jun. 10, 1994 | [JP] | Japan | 6-129004 |
| Jun. 10, 1994 | [JP] | Japan | 6-129005 |
| Jul. 22, 1994 | [JP] | Japan | 6-171261 |

[51] Int. Cl.$^6$ ............... G03H 1/20; G03H 1/00; G03H 1/04
[52] U.S. Cl. ............... 359/12; 359/1; 359/2; 430/1; 430/2
[58] Field of Search ............... 359/1, 2, 3, 12, 359/35, 900; 430/1, 2

[56] References Cited

U.S. PATENT DOCUMENTS

| 4,856,857 | 8/1989 | Takeuchi et al. | 359/3 |
| 4,995,685 | 2/1991 | Armstrong et al. | 359/3 |
| 5,282,066 | 1/1994 | Yu et al. | 359/3 |
| 5,453,338 | 9/1995 | Suga et al. | 430/1 |

FOREIGN PATENT DOCUMENTS

| 60254174 | 12/1985 | Japan | 359/12 |
| 6167917  | 6/1994  | Japan | 359/3  |

Primary Examiner—Paul M. Dzierzynski
Assistant Examiner—Audrey Chang
Attorney, Agent, or Firm—Sughrue, Mion, Zinn, Macpeak & Seas, PLLC

[57] ABSTRACT

A hologram duplicating method and apparatus whereby a photosensitive material film is continuously and smoothly brought into close contact with the surface of a hologram original plate, and the film is effectively delaminated after a duplicating process. The apparatus includes a film supply part (31) for supplying a photosensitive material film (1), a film laminating part for successively laminating the supplied film (1) on a hologram original plate (35) with the film (1) being squeezed with a roller (46) from the upper side, a film delaminating part for successively delaminating the film (1) from the original plate (35) from one end thereof with the film (1) being pressed with the roller (46), and a film take-up part (43) for taking up the delaminated film. The film (1) can be laminated on the original plate (35) without trapping air bubbles, and the film (1) can be delaminated from the original plate (35) without causing peel unevenness such as undesired lines. Also disclosed is a hologram produced by the duplicating method.

31 Claims, 14 Drawing Sheets

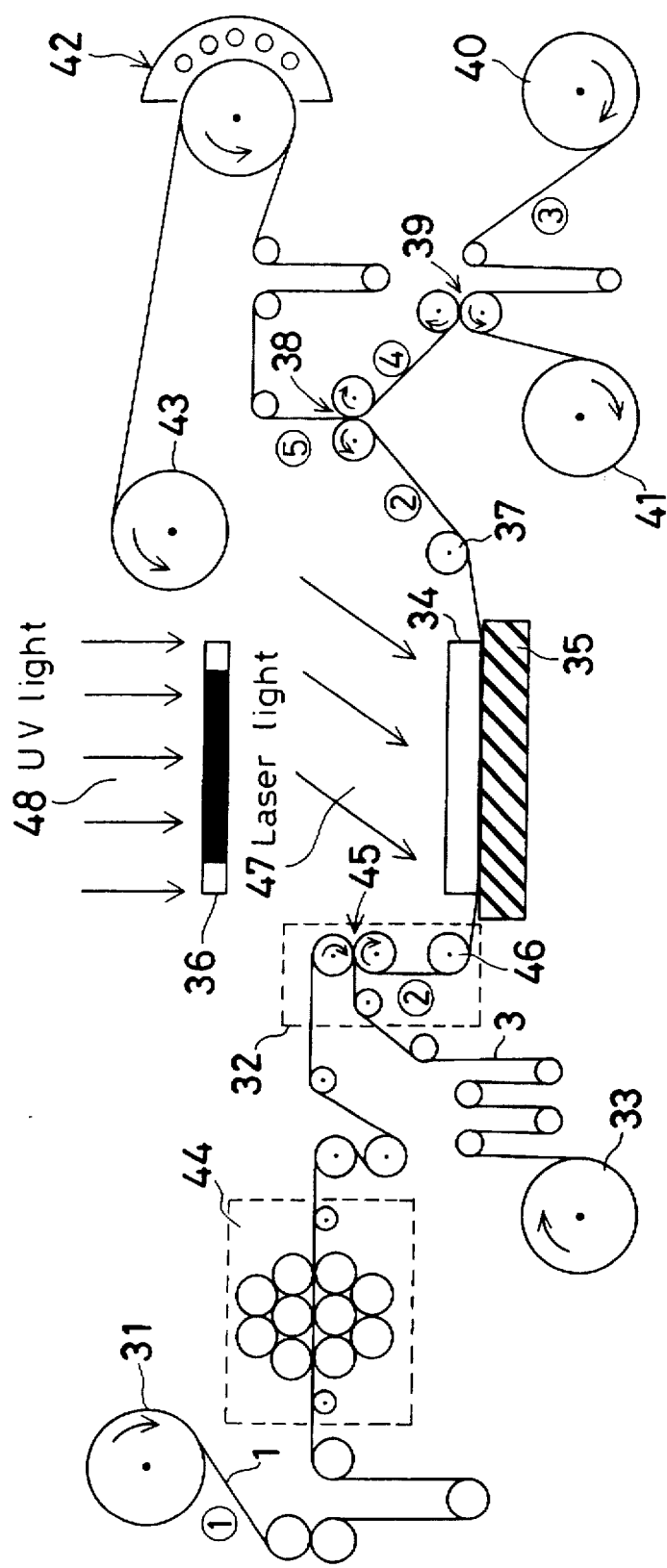

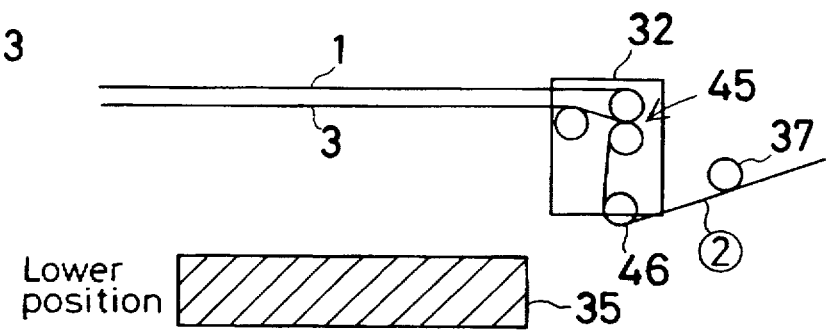
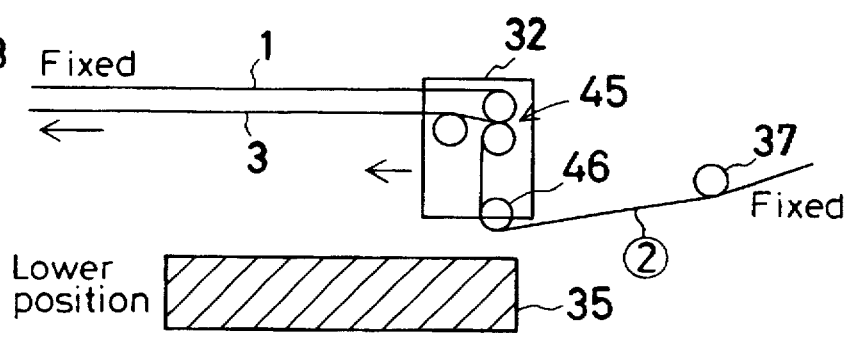
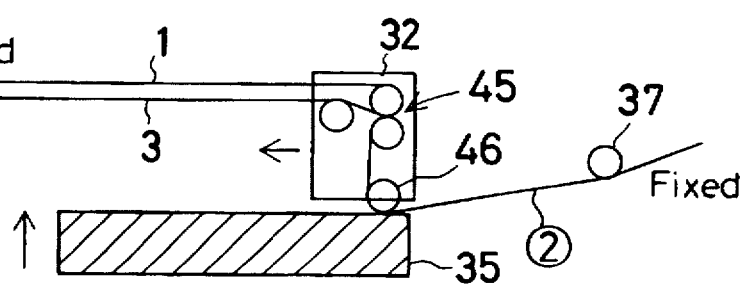
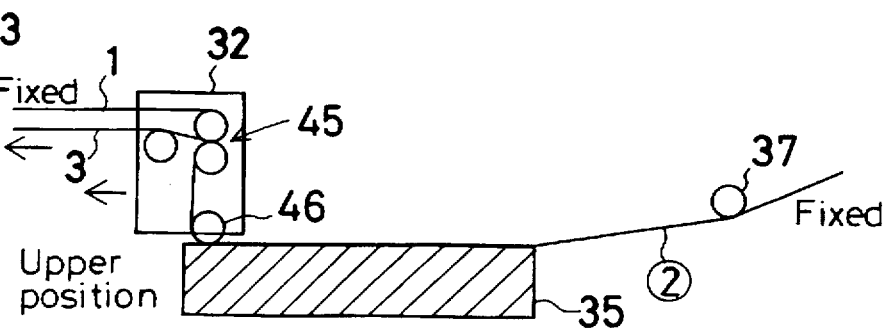

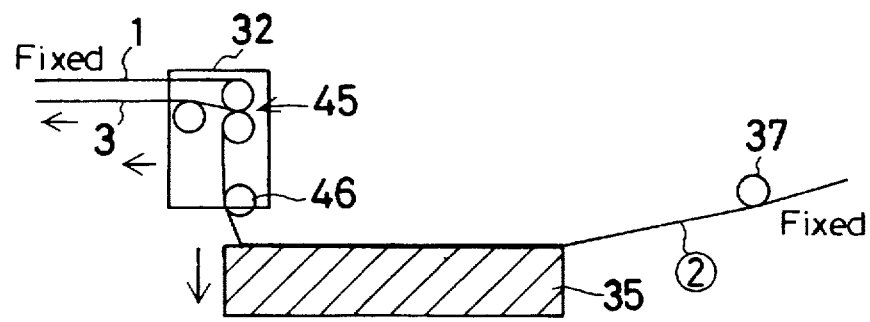
FIG.14 (5)
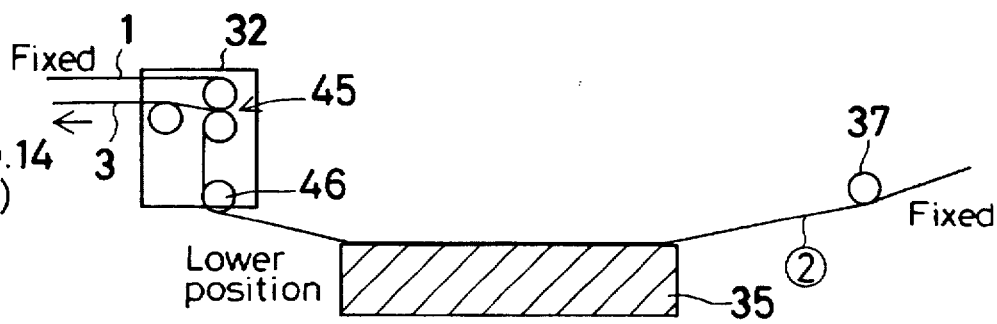
FIG.14 (6)
FIG.14
(7) Trimming, duplicating exposure, etc.
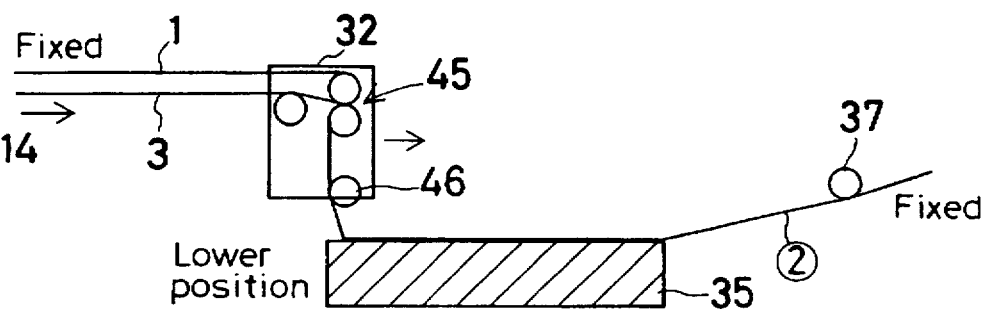
FIG.14 (8)
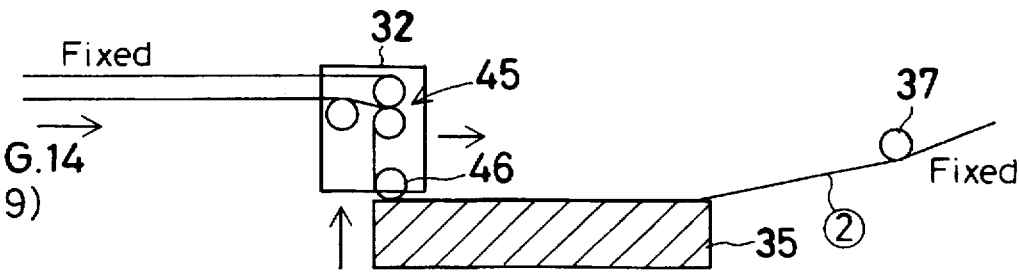
FIG.14 (9)

FIG.15 (10)
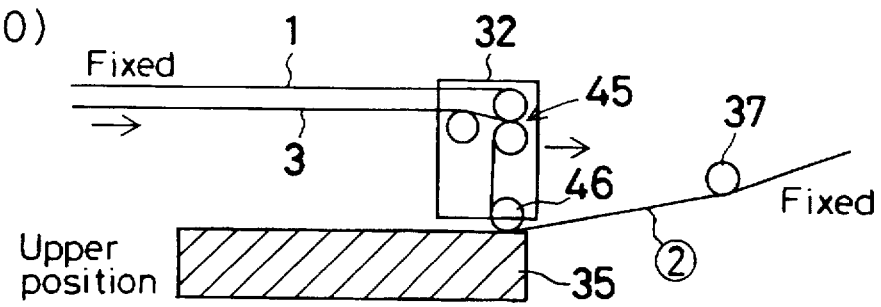
FIG.15 (11)
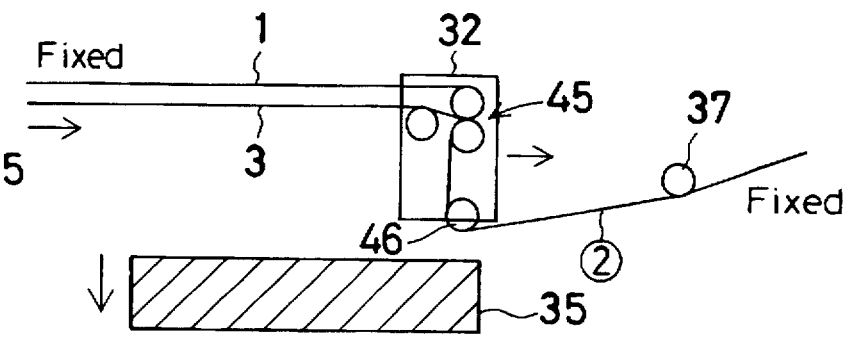
FIG.15 (12)
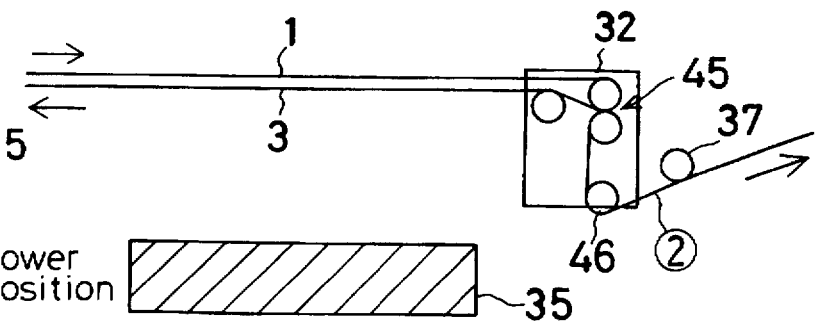

FIG. 16 (1)
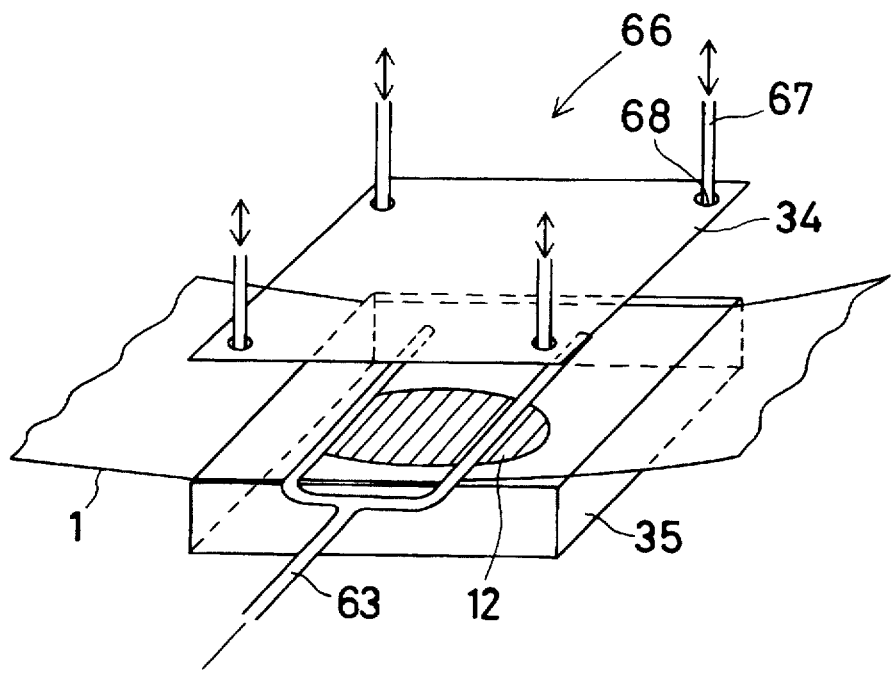
FIG. 16 (2)
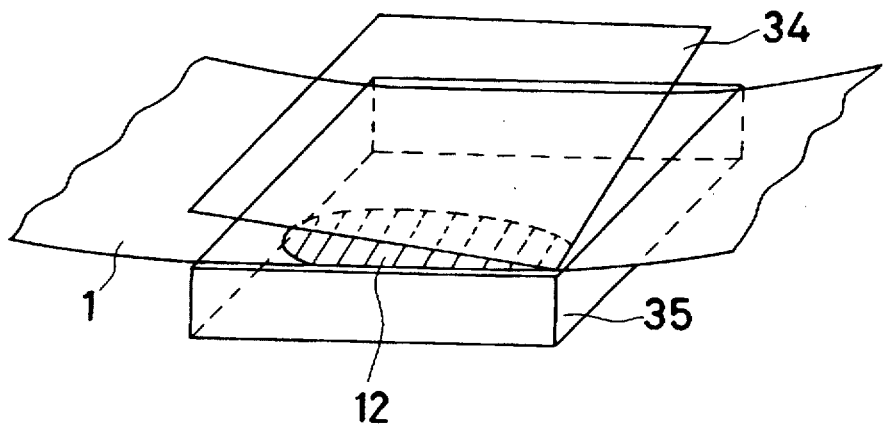

METHOD OF AND APPARATUS FOR DUPLICATING HOLOGRAM AND DUPLICATE HOLOGRAM

This is a continuation of application Ser. No. 08/297,053 filed Aug. 29, 1994 now abandoned.

BACKGROUND OF THE INVENTION

The present invention relates to a method of and apparatus for duplicating a hologram and also to a duplicate hologram. More particularly, the present invention relates to a hologram duplicating method and apparatus wherein a film of photosensitive material is continuously laminated on an original plate, and it is delaminated after a hologram image has been duplicated thereon. The present invention also relates to a hologram produced by such a duplicating method.

Duplication of a hologram original plate has been performed by applying a laser beam to the hologram original plate which is placed in close contact with a photosensitive material so that diffracted light from the original plate and the incident light interfere with each other in the photosensitive material, thereby recording a hologram image of the original plate in the photosensitive material. In this process, in order to prevent disruption of the image due to the back reflection component produced by reflection at the reverse surface of the photosensitive material, an index matching liquid that is substantially equal to the original plate in refractive index is interposed between the original plate and the photosensitive material, thereby enhancing the adhesion and thus preventing back reflection during the duplication of the hologram image.

Incidentally, the index matching liquid, which is interposed between the hologram original plate and the photosensitive material, is a thick liquid and difficult to apply with a uniform thickness because of fluidity, thickness unevenness, vibration, etc. In particular, when a large amount of index matching liquid is applied, it is impossible to effect favorable duplication of a hologram due to the flow of the index matching liquid. Even if duplication of a hologram is carried out in a clean room, dust particles 10 μm or less in diameter may get mixed in the index matching liquid. If duplication is carried out with dust particles mixed in the index matching liquid, the dust particles undesirably lift the film of photosensitive material and cause duplicating defects due to the flow of the index matching liquid around the dust particles.

To solve such a problem, Japanese Patent Application No. 04-327918 (1992) proposes a duplicating method and apparatus wherein a cushioning layer is used to bury dust particles to thereby reduce the incidence of duplicating defects. However, the proposed duplicating method and apparatus still suffer from problems in terms of durability and so forth.

SUMMARY OF THE INVENTION

In view of the above-described problems of the conventional technique, it is an object of the present invention to provide a hologram duplicating method and apparatus wherein a film of photosensitive material is continuously and surely brought into contact with the surface of a hologram original plate, and it is delaminated after a hologram image has been duplicated thereon, and also provide a hologram produced by the duplicating method.

Duplication of a hologram is carried out as shown in FIG. 1(a). That is, a photosensitive material film 1 is brought into close contact with the surface of a hologram original plate 5 through an index matching liquid 6 having a refractive index substantially equal to that of the original plate 5. Then, laser light 7 is applied from the photosensitive material film side (or from the hologram original plate side, as described later) so that the light 7 and diffracted light 8 from the original plate 5 interfere with each other in the photosensitive material film 1, thereby recording a hologram image in the photosensitive material film 1. The photosensitive material film 1 for hologram recording, which is made of a photopolymer or the like, is usually composed of 3 layers, that is, a base film 3, a photosensitive material 2, and a base film 4. If minute dust particles 9 are mixed in the index matching liquid 6 when the photosensitive material film 1 is brought into close contact with the hologram original plate 5, the dust particles 9 undesirably lift the film 1 and cause duplicating defects due to the flow of the index matching liquid 6 around the dust particles 9.

Therefore, the base film 3 that is closer to the original plate 5 is peeled off to expose the photosensitive material layer 2, which is a viscoelastic material, and the photosensitive material layer 2 is laminated directly on the original plate 5, as shown in FIG. 1(b), thereby burying the dust particles 9 in the layer 2, and thus making it possible to reduce the incidence of duplicating defects.

In this process, it is preferable to remove dust particles from the base films 3 and 4 by using gum rollers, as a matter of course. It is also preferable to use a static eliminator (ionized air spray, corona discharge, etc.) in order to suppress adsorption of dust particles due to static electricity generated when the base film 3 is peeled off.

Incidentally, if air bubbles are trapped when the photosensitive material film 1 with one base film 3 peeled therefrom is laminated directly on the original plate glass (glass substrate, in general) 5, the trapped air bubbles will lead to duplicating defects. According to the present invention, therefore, the photosensitive material film 1 is successively brought into close contact with the original plate 5 while being squeezed with a pressure roller from the upper side of the photosensitive material film 1. With regard to the diameter of the pressure roller and the film pass, a system as shown in FIG. 2(b) is preferable to a system as shown in FIG. 2(a). That is, it is preferable that the diameter of the roller 10 should be relatively small, while the film winding angle θ and the contact angle θ' of the hologram original plate 5 and the film 1 should be relatively large. More specifically, the diameter of the roller 10 is preferably as small as 100 mm or less, more preferably about 50 mm. Since the roller 10 may be deflected, it is preferable to apply pressure to the roller 10 by using another roller having a relatively large diameter. The film winding angle θ is preferably not smaller than 90°. The pressure of the roller 10 and the tension of the film 1 are also preferably set at relatively high levels: For example, the roller pressure is preferably not lower than 0.1 kgf/cm$^2$, and the film tension is preferably not lower than 0.1 kgf/cm$^2$. It should be noted that the reason why the area of contact between the roller 10 and the original plate glass 5 is shown as a plane in FIGS. 2(a) and 2(b) is that the roller 10 is deformed by the pressure applied thereto.

As described above, the photosensitive material film 1 is successively brought into close contact with the hologram original plate 5 while being squeezed with the roller 10 from the upper side thereof in order to prevent trapping of air bubbles when the photosensitive material film 1 with the base film 3 peeled therefrom is laminated directly on the original plate 5. In such a case, if the photosensitive material film 1 is brought into close contact with the whole surface of the original plate 5, as shown in FIG. 3(a), force concentrates on portions of the photosensitive material film 1 that correspond to edges 5' of the original plate 5, causing the photosensitive material film 1 to be damaged. Therefore, as shown in FIG. 3(b), the photosensitive material film 1 is brought into close contact with not the whole surface of the original plate 5 but only the central region of the original plate 5, exclusive of the edges 5', while being squeezed with the roller 10 as described above, thereby preventing the photosensitive material film 1 from being damaged by the edges 5'. Further, as shown in FIG. 3(b), the photosensitive material film 1 is lifted from the original plate 5 at both ends of the original plate 5 in the roller squeezing direction and held at a with respect to small angle α to the surface of the original plate 5. By laminating the photosensitive material film 1 on the original plate 5 in this way, no air bubbles are trapped, and there is no damage to the portions of the photosensitive material film 1 that correspond to the edges 5' of the original plate 5. It should be noted that the angle α is determined by the adhesion F of the photosensitive material layer 2 constituting the photosensitive material film 1 to the original plate 5 and the tension f of the photosensitive material film 1 so as to satisfy the condition of $\alpha < \sin^{-1}(f/F)$. In general, it is preferable to set the angle α in the range of from 2° to 10°. By doing so, no damage is done to the photosensitive material film 1, and there is no likelihood of the photosensitive material film 1 delaminating from the original plate 5 during the duplicating process.

When laser light is used to duplicate the original plate 5, it is preferable to use an anti-reflection coated glass for the purpose of eliminating noise due to the back reflection of the incident light. In the case of a reflection hologram original plate 5, it is preferable to carry out the duplicating process using a layer configuration such as that shown in FIG. 4(a), which is composed, in order from the side of laser light incidence, of an anti-reflection coated glass 11, an index matching liquid 12, a base film 4, a photosensitive material 2, a hologram original plate 5, and a light-absorbing material 13. In the case of a transmission hologram original plate 5, it is preferable to perform optical duplicating process using a layer configuration which is composed, as shown in FIG. 4(b), of an anti-reflection coated glass 11, a hologram original plate 5, a photosensitive material 2, and a base film 4. The base film 4 is preferably of the optical absorption type or provided with anti-reflection coating. It should be noted that in the case of a reflection hologram original plate 5, another anti-reflection coated glass 11 may be disposed in place of the light-absorbing material 13 to prevent back reflection of light passing through the original plate 5.

It is also preferable to add an ionizing radiation masking device whereby, prior to the optical duplicating process by the laser light 7, an ionizing radiation to which the photosensitive material 2 is sensitive, such as ultraviolet light, is applied to a region of the photosensitive material 2 other than a region where a hologram image is to be recorded. This effects trimming (i.e., the region that is not used for duplication is sufficiently exposed to the light so as to lose its photosensitivity to the laser light 7). More specifically, it is possible to adopt either contact exposure or projection exposure. In the case of contact exposure, as shown in FIG. 5(a), a trimming mask 14 is brought into close contact with the surface of the photosensitive material film 1, and exposure is carried out by ultraviolet light 15. In the case of projection exposure, as shown in FIG. 5(b), the trimming mask 14 is disposed away from the photosensitive material film 1, and projection is effected by divergent light 17 or the like from an ultraviolet light source 16. Of the two exposure methods, the projection exposure is advantageous over the contact exposure from the viewpoint of ensuring a space for the pressure roller 10 [FIG. 2(b)], the anti-reflection coated glass 11 [FIG. 4(a) and 4(b)], etc. over the photosensitive material film 1.

It should be noted that it is necessary to provide an ionizing radiation irradiator for lowering the adhesion of the photosensitive material film 1 when delaminated from the original plate 5 after the optical duplicating process has been carried out by the laser light 7 as described above. For this purpose, the ultraviolet light 15 or 17 alone may be used with the trimming mask 14 removed from the ionizing radiation masking device used in the previous process. With a view to lowering the adhesion of the original plate 5, it is preferable that the surface of the original plate 5 with which the photosensitive material film 1 is to come in close contact should be subjected to release treatment in advance by using a fluorine-containing releasing agent, a silicone-containing releasing agent, etc.

Incidentally, if one end of the photosensitive material film 1 is merely pulled up from the original plate 5 when the photosensitive material film 1 is to be delaminated, a peel rate difference is produced in the plane of the photosensitive material film 1, resulting in peel unevenness, e.g., an undesired line, along the peel front at a position where the delamination stops or the peel rate is low. Thus, the duplicate which has been favorably made so far becomes defective. More specifically, if the photosensitive material film 1 is pulled up from one end thereof, as shown in FIG. 6(a), it is first delaminated rapidly as far as the position ①, shown in the figure, where the delamination suspends. Then, the photosensitive material film 1 is delaminated rapidly as far as the position ②. If such discontinuous delamination is carried out, undesired lines occur on the photosensitive material film 1 at the positions ① and ②. To prevent the occurrence of such lines, the photosensitive material film 1 should preferably be delaminated successively while being pressed with a roller 18, as shown in FIG. 6(b), in the same way as in the case where the photosensitive material film 1 is laminated on the original plate 5 [FIG. 2(b)]. In this case also, it is preferable to use a roller 18 having a relatively small diameter. The roller 10 used when the photosensitive material film 1 is laminated on the original plate 5 may be used as the roller 18 for delamination by rotating it in reverse.

In the photosensitive material film 1 delaminated in this way, the surface of the photosensitive material 2 is exposed. Therefore, it is necessary in order to take up the photosensitive material film 1 effectively to laminate a protective film on the photosensitive material-side surface of the photosensitive material film 1. Accordingly, as shown in FIG. 6(b), a protective film 20 having an adhesive layer or pressure-sensitive adhesive layer on one side thereof is laminated on the delaminated photosensitive material film 1, with the adhesive or pressure-sensitive adhesive layer facing toward the film 1, through a roller 19 rotating in reverse relation to the roller 18. In this case, an ionizing radiation treatment may be needed after the protective film 20 has been laminated on the photosensitive material film 1 in order to raise the adhesion or to fix the photosensitive material. In such a case, an ionizing radiation irradiator must be provided. It should be noted that the photosensitive material film 1 can be made into a seal type photosensitive material film by using a protective film 20 having high release properties.

Incidentally, a film 1 of continuous length is usually used to duplicate the original plate 5 and this film 1 is intermittently fed onto the original plate 5 by a length determined by adding the distance between each pair of adjacent frames to the dimension of one frame, thereby periodically producing a plurality of duplicates. That is, as shown in FIG. 7, on the photosensitive material film 1 hologram duplicate regions A having a dimension a in the longitudinal direction of the film 1 are periodically formed at frame spacings b. The film 1 is generally transported by nip rollers (pairs of rollers) provided in front of and behind the exposure position. Therefore, when the original plate 5 is duplicated by the above-described intermittent feed of the film 1, the pressure of the nip rollers is continuously applied to portions of the film 1 which lie in between the nip rollers during the suspension of the feed of the film 1, resulting in linear recesses being formed on the film 1. If such a recess is formed at a position corresponding to a hologram region A, it constitutes a defect.

Therefore, as shown in FIG. 8, the positions of all nip rollers R and R' which are provided in front of and behind the exposure position are set so that the distances x and x' along the film pass from the center line of the original plate 5 to the nip rollers R and R', which are in front of and behind the exposure position, satisfy the following relationship:

$$n(a+b)+a/2<x, \ x'<n(a+b)+a/2+b$$

where n is zero or a positive integer.

By doing so, linear recesses attendant on the suspension of the feed of the film 1 during the holographic recording process lie in the spacings between adjacent hologram regions A. Accordingly, the linear recesses have no adverse effect on products obtained by cutting the hologram regions A. It should be noted that the frame spacing b should be selected so as to be larger than the nip width of the nip rollers R and R' (i.e., the width of linear recesses), as a matter of course.

Incidentally, when a reflection hologram original plate 5 as shown in FIG. 4(a) is used, the anti-reflection coated glass 11 is brought into close contact with the laser light incidence side of the film 1 through the index matching liquid 12 in order to eliminate noise due to the back reflection of the incident light. If the index matching liquid 12 spreads in the longitudinal direction of the film 1 and further advances in the film feed direction, it transfers to the feed rollers, which are made of a rubber material, e.g., NBR or IIR, and causes change in the shape, dimension and hardness of the rollers because a solvent liquid is usually employed as the index matching liquid 12, e.g., xylene, Isoper or Cargil standard refraction liquid. As a result, nip marks are left on the film 1, thus giving rise to problems. Therefore, the occurrence of such problems must be prevented. If the index matching liquid 12 passes around behind the photosensitive material layer 2 on the reverse side of the film 1, the photosensitive material 2 is damaged. Accordingly, it is also necessary to prevent the occurrence of such problem.

To prevent the occurrence of these problems, the present invention takes measures as shown in FIGS. 9(a), 9(b) and 9(c). FIG. 9(a) is a sectional view taken along the film longitudinal direction. FIG. 9(b) is a sectional view taken along a direction traversing the film, and FIG. 9(c) is a plan view. As shown in these figures, before the anti-reflection coated glass 11 is pressed on the film 1, a pair of barrier members 60 for preventing the index matching liquid 12 from spreading in the film longitudinal direction are lightly pressed on the film 1 brought into close contact with the original plate 5 at respective positions near both ends of the original plate 5 and outside the effective duplicating region.

Further, in order to prevent the index matching liquid 12 from passing around behind the photosensitive material layer 2 on the contact side of the film 1, the surface of the original plate 5 is provided with grooves 61 along two edges extending in the film longitudinal direction, and embankments 62 are formed between the two edges of the original plate 5 and the grooves 61, respectively, so that the two edges of the film 1 lie on the embankments 62, respectively. By doing so, if the index matching liquid 12 dropped from an index matching liquid supply pipe 63 overflows, it is prevented from passing around behind the photosensitive material layer 2 by the embankments 62. Even if the index matching liquid 12 passes over the embankments 62, it falls in the grooves 61. Therefore, no index matching liquid 12 reaches the photosensitive material 2 in the effective duplicating region, and there is no likelihood of the photosensitive material 2 being damaged by the index matching liquid 12.

It should be noted that the barrier members 60 for preventing the index matching liquid 12 from spreading in the film longitudinal direction may be omitted in a case where the film 1 outside the effective duplicating region is tilted upwardly, as shown in FIG. 3(b).

Incidentally, it is preferable to use an index matching liquid supply pipe 63 whose distal end is branched into two or more branches, as clearly shown in FIG. 9(c), and which is capable of simultaneously dropping the index matching liquid 12 from a plurality of holes, to drop the index matching liquid 12 onto the film 1 in the system taking the above-described measures to prevent undesired spread and passage of the index matching liquid 12. The use of the index matching liquid supply pipe 63 enables the index matching liquid 12 to be efficiently and uniformly dropped in a shortened time.

If the anti-reflection coated glass 11 is removed from the film 1 after the original plate 5 has been duplicated and the film 1 is taken up as it is, the remaining index matching liquid 12 will damage the feed rollers and spoil the photosensitive material 2, and it is unfavorable that the index matching liquid 12 is attached to the film 1 as a finished product. It is also necessary to prevent the index matching liquid 12 from adhering to the anti-reflection coated glass 11 removed upwardly from the film 1 and from dropping onto the original plate 5 or an undesired portion of the film 1. Therefore, it is preferable to take the following measures. First, the surface of the anti-reflection coated glass 11 that is to come in close contact with the film 1 is previously subjected to repellent treatment using a fluorine-containing repellent, a silicone-containing repellent, etc.

Then, as shown in FIG. 10, the index matching liquid 12 remaining on the film 1 is wiped off with a squeegee (wiper) 64 which is concavely (arcuately) curved in the wiping direction shown by the arrow in the figure. It is also possible to absorb the remaining index matching liquid 12 by bringing a sponge into contact with the surface of the film 1 instead of using the squeegee 64. The remaining index matching liquid 12 may be scraped off with an air doctor. Further, it is preferable to dry the remaining index matching liquid 12.

As will be clear from the foregoing description, the present invention provides a hologram duplicating method wherein a photosensitive material film is brought into close contact with a hologram original plate which is to be duplicated, and light is applied from the photosensitive material film side or from the side opposite thereto, thereby duplicating a hologram image of the hologram original plate onto the photosensitive material film. The photosensitive material film is composed of a photosensitive material and two base films attached to both sides thereof. With the photosensitive material film being supplied, the base film is peeled off from one side thereof, and the photosensitive material film is successively laminated on the hologram original plate with the exposed photosensitive material surface facing toward the hologram original plate while the photosensitive material film is being squeezed with a roller from the side opposite to the exposed side. Then, light is applied from the photosensitive material film side or from the side opposite thereto. Thereafter, the photosensitive material film laminated on the hologram original plate is successively delaminated from one end thereof with the photosensitive material film being pressed with a roller, and a protective film is successively laminated on the exposed photosensitive material surface of the delaminated photosensitive material film. Thereafter, the photosensitive material film is taken up.

In this case, referring to FIG. 4(a) the hologram original plate to be duplicated is preferably composed of a releasing agent layer 5a, a cover glass 5b, an adhesive layer 5c, a hologram layer 5d, a light-absorbing layer 5e, an adhesive layer 5f, a substrate 5g, and a light-absorbing layer 5h, which are partly or entirely stacked in the mentioned order. Alternatively, the hologram original plate is preferably composed of a releasing agent layer, a cover glass, an adhesive layer, a hologram layer, an adhesive layer, and a colored glass, which are partly or entirely stacked in the mentioned order.

The hologram original plate may be arranged such that the hologram layer includes a plurality of layers having different wavelengths or angles of diffraction, and barrier layers are provided between these layers and between the hologram layer and layers overlying and underlying it.

It is also preferable that the photosensitive material film having the base film peeled off from one side thereof should be successively laminated, while being squeezed with a roller, on only the central region of the hologram original plate, exclusive of two edges of the hologram original plate at both ends in the roller squeezing direction. In this case, it is preferable to lift edges of the photosensitive material film at both ends in the roller squeezing direction which are not in contact with the hologram original plate and to hold these edges of the film at a small angle to the surface of the original plate.

Further, it is preferable to use a photosensitive material film of continuous length and to dispose at least one nip roller in front of or behind a duplicating position to intermittently feed the photosensitive material film onto the original plate by a length determined by adding the distance b between each adjacent frames to the dimension a of one frame, thereby periodically producing a plurality of duplicates. The nip roller is preferably disposed so that the distance x from the center line of the original plate to the nip roller along the film pass satisfies the following relationship:

$$n(a+b)+a/2<x<n(a+b)+a/2+b$$

where n is zero or a positive integer.

In addition, the present invention provides a hologram duplicating apparatus which includes: a film supply part for supplying a photosensitive material film composed of a photosensitive material and a pair of base films attached to both sides of the photosensitive material; a base film peeling part for peeling the base film from one side of the photosensitive material film supplied from the film supply part; a film laminating part for successively laminating on a hologram original plate to be duplicated the photosensitive material film supplied with the exposed photosensitive material surface facing toward the hologram original plate while squeezing the photosensitive material film with a roller from the side opposite to the exposed side; an optical hologram duplicating part for optically duplicating a hologram image of the hologram original plate onto the photosensitive material film, which is laminated on the hologram original plate; a film delaminating part for successively delaminating the photosensitive material film from the hologram original plate from one end thereof while pressing the photosensitive material film with a roller; a protective film laminating part for successively laminating a protective film on the exposed photosensitive material surface of the photosensitive material film delaminating from the hologram original plate; and a film take-up part for taking up the photosensitive material film having the protective film laminated thereon.

In this case, the roller in the film laminating part may be arranged to serve also as the roller in the film delaminating part.

In this case, the hologram original plate to be duplicated is preferably composed of a releasing agent layer, a cover glass, an adhesive layer, a hologram layer, a light-absorbing layer, an adhesive layer, a substrate, and a light-absorbing layer, which are partly or entirely stacked in the mentioned order. Alternatively, the hologram original plate is preferably composed of a releasing agent layer, a cover glass, an adhesive layer, a hologram layer, an adhesive layer, and a colored glass, which are partly or entirely stacked in the mentioned order.

The hologram original plate may be arranged such that the hologram layer includes a plurality of layers having different wavelengths or angles of diffraction, and barrier layers are provided between these layers and between the hologram layer and layers overlying and underlying it.

It is preferable to provide at least either a cleaning gum roller for removing foreign matter from the photosensitive material film supplied from the film supply part, or a static eliminator for preventing adsorption of foreign matter by static electricity.

Further, it is preferable to provide a trimming device for irradiating the photosensitive material film with light in a pattern to which the photosensitive material film is sensitive at the same time as or before the optical duplicating process is carried out in the optical hologram duplicating part, thereby making the photosensitive material film lose its photosensitivity in the pattern of the applied light.

It is also possible to provide a uniform exposure device for reducing the adhesion of the photosensitive material film to the hologram original plate after the optical duplicating process has been carried out in the optical hologram duplicating part.

It is preferable that the protective film should have an adhesive layer or a pressure-sensitive adhesive layer on one side thereof, and that in the protective film laminating part the protective film should be laminated on the photosensitive material film with the adhesive or pressure-sensitive adhesive layer facing toward the exposed photosensitive material surface of the photosensitive material film delaminated from the hologram original plate.

It is also possible to dispose an ionizing radiation irradiator for applying an ionizing radiation to the protective film and the photosensitive material film between the protective film laminating part and the film take-up part.

Further, it is preferable to dispose a device for developing an index matching liquid over the surface of the photosensitive material film after the photosensitive material film has been laminated on the hologram original plate in the film laminating part, and a device for stacking a transparent member on the supplied index matching liquid. In this case, the index matching liquid spreading device preferably has an index matching liquid supply device having at least two outlet ports, and it is also preferable for the index matching liquid spreading device to have a device for preventing the index matching liquid spread over the surface of the photosensitive material film from spreading beyond the necessary portion and from passing around behind the photosensitive material film. The transparent member stacking device preferably has a device for controlling the lowering of the transparent member onto the surface of the photosensitive material film so that the transparent member comes in contact with the surface of the photosensitive material film in the following sequence: contact at one point, contact at one side, contact at two sides, and contact at the whole surface.

It is preferable to dispose a device for removing the index matching liquid remaining on the surface of the photosensitive material film before the photosensitive material film is successively delaminated from the hologram original plate in the film delaminating part. It is also preferable to dispose a device for drying the photosensitive material film after the removal of the index matching liquid.

In addition, the present invention provides a duplicate hologram which is formed from a photosensitive material film of continuous length that is composed of at least one adhesive or pressure-sensitive adhesive layer and at least one photosensitive material layer, which are sandwiched between a pair of base films. The photosensitive material film has hologram duplicating regions periodically formed at predetermined frame spacings with a uniform dimension in the longitudinal direction of the film.

In this case, a volume phase hologram may be recorded in each hologram duplicating region. Further, no hologram may be recorded in a region other than the hologram duplicating regions.

It should be noted that at least the base film that is in contact with the adhesive or pressure-sensitive adhesive layer is preferably arranged to be peelable.

According to the present invention, a photosensitive material film, which is composed of a photosensitive material sandwiched between a pair of base films, is supplied, and while doing so, the base film is peeled off from one side thereof, and the photosensitive material film is successively laminated on a hologram original plate to be duplicated with the exposed photosensitive material surface facing toward the hologram original plate while the photosensitive material film is being squeezed with a roller from the side opposite to the exposed side. Then, light is applied from the photosensitive material film side or from the side opposite thereto. Thereafter, the photosensitive material film laminated on the hologram original plate is successively delaminated from one end thereof with the photosensitive material film being pressed with a roller, and a protective film is successively laminated on the exposed photosensitive material surface of the delaminated photosensitive material film. Thereafter, the photosensitive material film is taken up. Therefore, no air bubbles are trapped when the film is laminated on the original plate, and no peel unevenness, e.g., undesired line, occurs when the film is delaminated from the original plate.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 12(a) and 12(b)1 to 12(b)5 show the arrangement of a hologram duplicating apparatus in one embodiment of the present invention.

FIGS. 13(1) to 13(4) show steps in the process of laminating a duplicating film on a hologram original plate and of delaminating the film from the original plate in one embodiment of the present invention.

FIGS. 14(5) to 14(9) show steps subsequent to the steps shown in FIGS. 13(1) to 13(4).

FIGS. 15(10) to 15(12) show steps subsequent to the steps shown in FIGS. 14(5) to 14(9).

FIGS. 16(1) and 16(2) show steps in a method of placing an anti-reflection coated glass on a laminated duplicating film.

DESCRIPTION OF THE PREFERRED EMBODIMENTS

Embodiments of the hologram duplicating method and apparatus according to the present invention will be described below.

[Embodiment 1]

Figure 11:
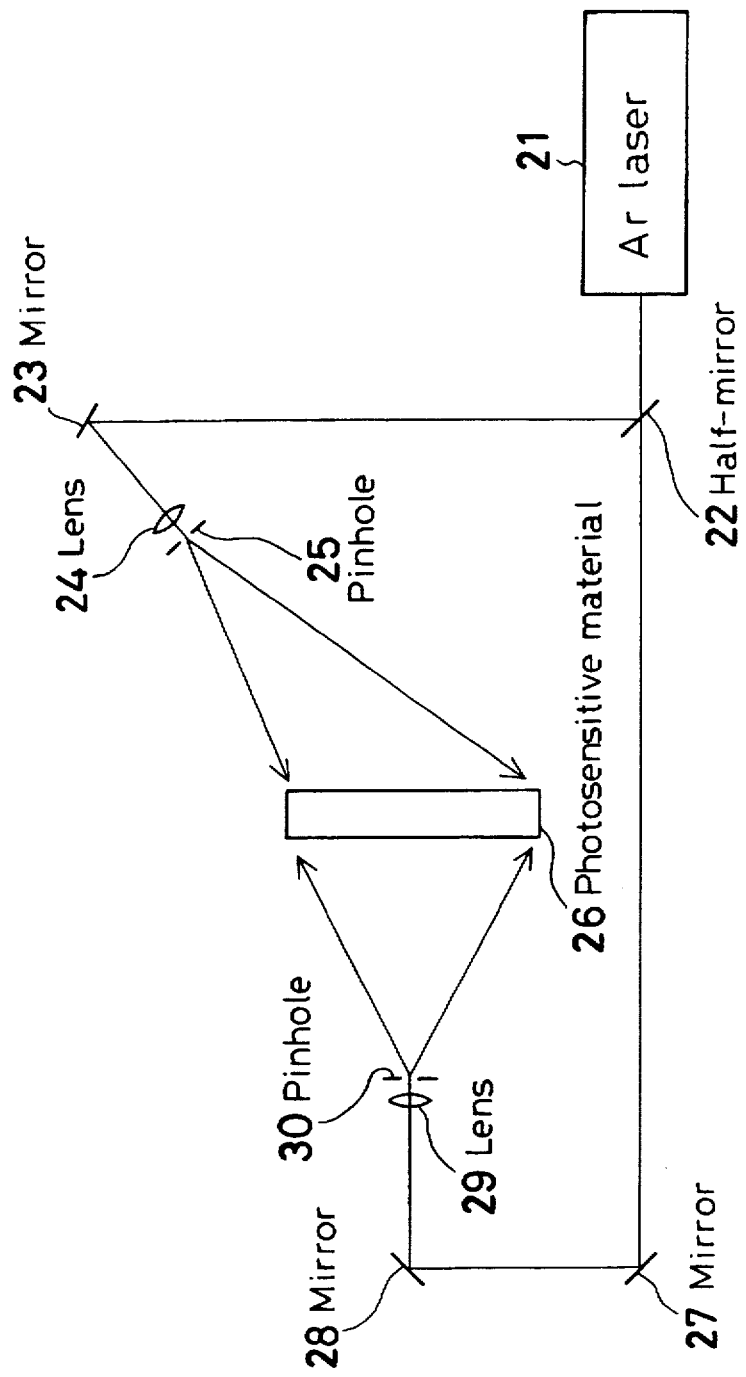
FIG. 11 shows the arrangement of a hologram original plate photographing optical system in a first embodiment of the present invention.

A Lippmann hologram (reflection hologram) original plate is photographed by using an optical system such as that shown in FIG. 11. That is, light emitted from an Ar laser 21 is split into two light beams by a half-mirror 22. One light beam passes via a mirror 23 and a lens 24 so as to be condensed to a pinhole 25. Divergent light emanating from the pinhole 25 is obliquely incident on one side of a photosensitive material 26. The other light beam passes via mirrors 27 and 28 and a lens 29 so as to be condensed to a pinhole 30, and divergent light emanating from the pinhole 30 is incident on the other side of the photosensitive material 26. The two divergent light beams interfere with each other in the photosensitive material 26, thereby recording a hologram in the photosensitive material 26. As the photosensitive material 26, Omnidex-352 holographic recording film, manufactured by Du Pont U.S.A., may be used. The exposure energy is 30 mJ/cm$^2$ by light of wavelength 514 nm from the Ar laser 21. After the exposure, the photosensitive material 26 having a hologram recorded therein is subjected to uniform exposure at 100 mJ/cm$^2$ by using a super-high pressure mercury lamp. Then, the photosensitive material 26 is sandwiched between a pair of glass plates and sealed with an optical adhesive (NOA-61, manufactured by Noland U.S.A), thereby preparing a hologram original plate 35. The surface of the hologram original plate 35 with which a duplicating photosensitive material film is to be brought into close contact is subjected to release treatment in advance by using a fluorine-containing releasing agent, a silicone-containing releasing agent, etc. Further, as shown in FIG. 9(b), grooves 61 are provided in the surface of the hologram original plate 35 [5 in FIG. 9(B)] which are to be contacted by the duplicating photosensitive material film along two edges in the film longitudinal direction, and embankments 62 are formed between the two edges of the original plates 35 (5) and the grooves 61.

Next, the hologram original plate 35 is incorporated into a duplicating apparatus such as that shown in FIG. 12(a). In this apparatus, as the duplicating photosensitive material film 1, Omnidex-352 holographic recording film having a triple-layer configuration which is composed of a base film 3, a photosensitive material 2 and a base film 4, as shown in the sectional view of FIG. 12(b)①, is used. As a protective film 50, a protective film which is composed, as shown in the sectional view of FIG. 12(b)③, of a PET (polyethylene terephthalate) 51 of 50 µm in thickness, an optical adhesive (NOA-61, manufactured by Noland U.S.A.) 52 of 1 µm in thickness, and a PET 53 of 50 µm in thickness is used.

The arrangement of the duplicating apparatus, together with the function thereof, will be explained below. A supply roller 31 has the duplicating photosensitive material film 1 set thereon. The film 1 is delivered from the supply roller 31 and cleaned through a cleaning unit 44 which is composed of gum rollers. Then, the base film 3 is peeled off from one side of the film 1 by peeling rollers 45 in a laminating and delaminating head 32. The peeled base film 3 is taken up by a take-up roller 33. Meanwhile, the film 1 having the photosensitive material surface exposed is laminated on the central region of the glass plate constituting the hologram original plate 35 by the movement of the laminating and delaminating head 32 from the right toward the left as viewed in the figure and the vertical movement of the hologram original plate 35, as described later. At this time, the stop position of the laminating and delaminating head 32, the lifting timing of the hologram original plate 35 and the position of a guide roller 37 are set so that the lift angle α ( [FIG. 3(b)] of the duplicating photosensitive material film 1 at each end of the original plate 35 is in the range of from about 2° to about 10°.

Figure 9A:
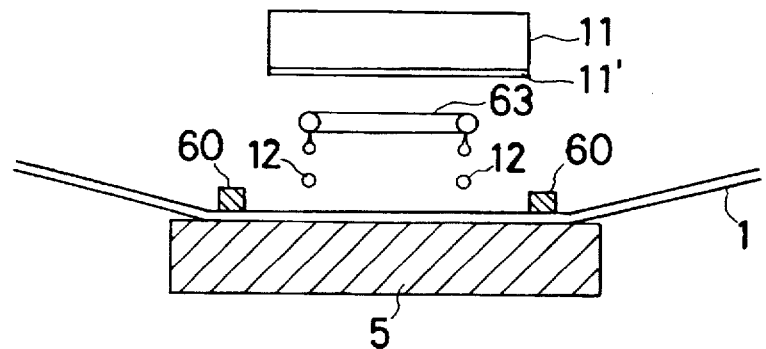
FIGS. 9(a), 9(b) and 9(c) show an arrangement for dropping an index matching liquid onto a film, and also show an arrangement for preventing the index matching liquid from spreading and passing around behind the film.
Figure 9B:
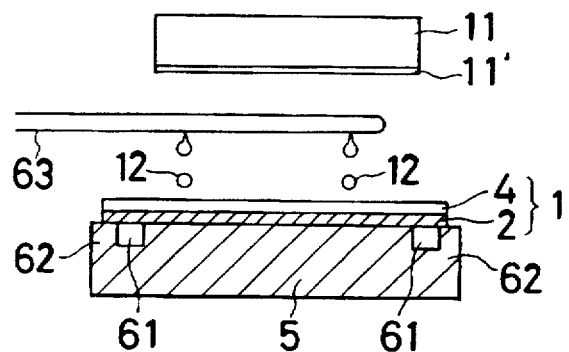
Figure 9C:
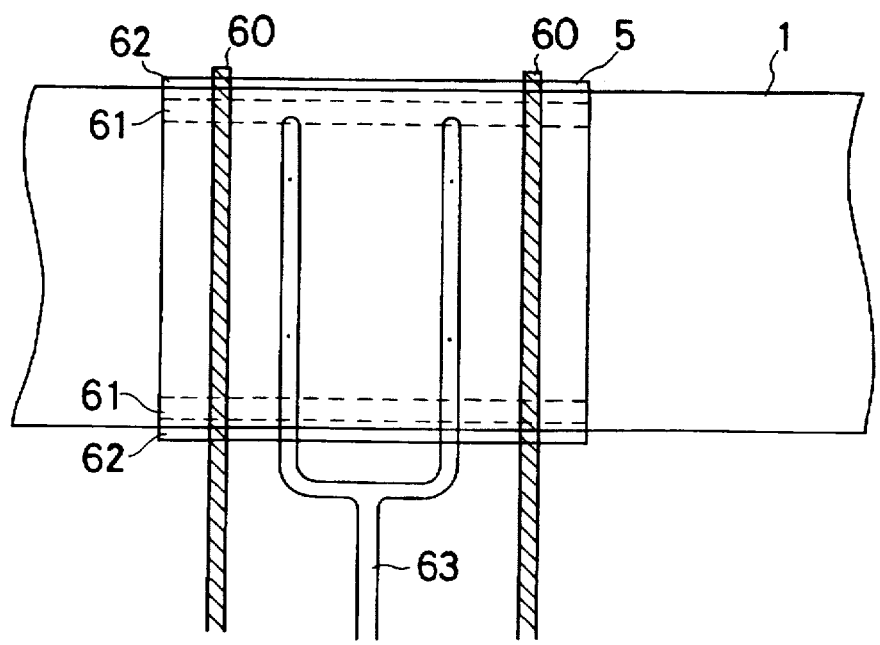

Next, barrier members 60 such as those shown in FIGS. 9(a) and 9(c) are inserted sideways into the space above the original plate 35 with the film 1 laminated thereon and lightly pressed on portions of the film 1 which are in close contact with the original plate 35 (5) at respective positions which are near the two ends thereof and outside the effective duplicating region. Then, an index matching liquid supply pipe 63 such as that shown in FIG. 9(c), whose distal end is branched into two or more and which is capable of simultaneously dropping an index matching liquid from a plurality of holes, is advanced sideways into the space above the original plate 35, and a proper quantity of xylene as an index matching liquid is dropped onto the film 1 laminated on the original plate 35. Thereafter, the index matching liquid supply pipe 63 is withdrawn, and an anti-reflection coated glass 34 (11) is carefully placed on the layer of index matching liquid so that no bubbles are trapped. The manner of placing the anti-reflection coated glass 34 will be explained later in more detail. It should be noted that the surface of the anti-reflection coated glass 34 which is to come in contact with the index matching liquid is previously subjected to repellent treatment using a fluorine-containing repellent, a silicone-containing repellent, etc.

Thereafter, projection exposure is carried out by applying ultraviolet light 48 from a super-high pressure mercury lamp (not shown) through a chromium trimming mask 36, thereby shielding only the central portion of the laminate region of the photosensitive material 2, and exposing the peripheral portion, exclusive of the central portion, at a dose rate of 30 mJ/cm$^2$, and thus making the peripheral portion lose its photosensitivity. In this way, trimming (masking) is carried out.

Next, Ar laser light 47 which is in conjugate relation to the laser light used in the original plate photographing process is applied to the original plate 35 from the film side (dose rate: 30 mJ/cm$^2$) to effect duplication.

Figure 10:
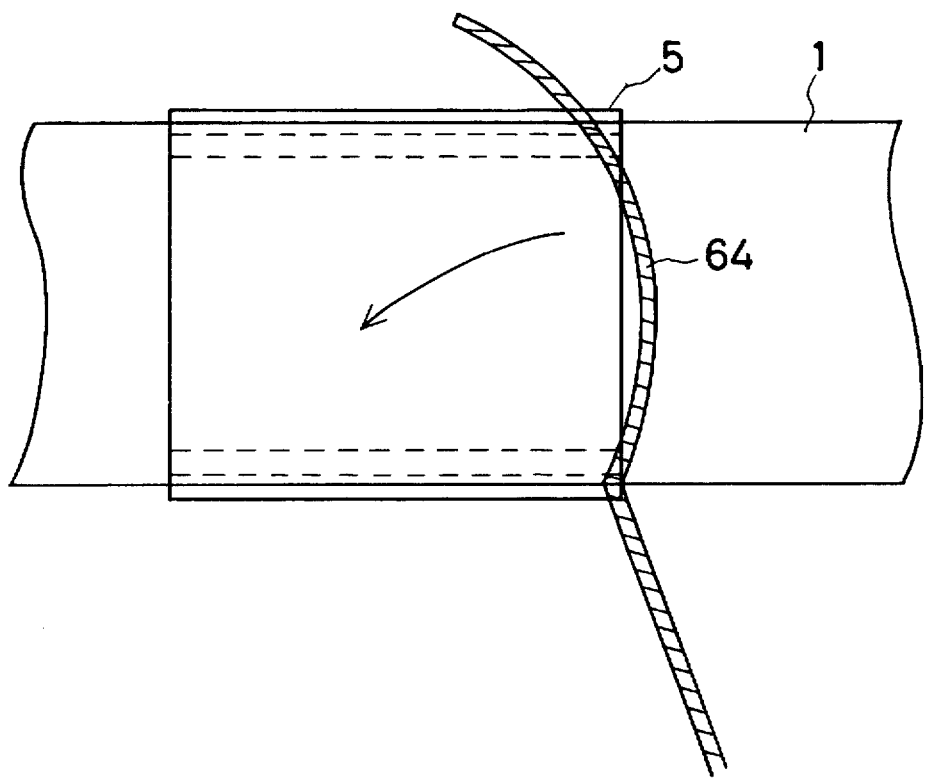
FIG. 10 shows an arrangement for wiping off the index matching liquid.

After the above-described exposure process, the anti-reflection coated glass 34 is peeled off from the film 1. Meanwhile, the squeegee (wiper) 64 which is concavely (arcuately) curved in the wiping direction shown by the arrow in FIG. 10 is inserted and lightly pressed on the film 1 to wipe the surface of the film 1 in the direction of the arrow, thereby cleaning up the index matching liquid. The index matching liquid that still remains is dried by heated air.

Next, the photosensitive material film 1 is delaminated and the film 1 is fed by a length determined by adding the frame spacing to the dimension of one frame by the movement of the laminating and delaminating head 32 from the left toward the right as viewed in the figure and the vertical movement of the hologram original plate 35, as described later. At this time, a protective film 50 with an adhesive layer 52 is laminated on the photosensitive material side of the photosensitive material film 1 by laminating rollers 38. At this time, the cover sheet 51 (PET of 50 µm in thickness) of the protective film 50 supplied from a supply roller 40 is peeled off by peeling rollers 39 and taken up by a take-up roller 41.

The photosensitive material film 1 having the protective film 50 laminated thereon enters an ultraviolet irradiator 42 where it is exposed to ultraviolet light from a super-high pressure mercury lamp at 100 mJ/cm$^2$, and thereafter the photosensitive material film 1 is taken up by a take-up roller 43. The exposure by the use of ultraviolet light is a treatment for enhancing the adhesion of the adhesive layer 52. It should be noted that an antistatic device is provided for each of the peeling rollers 45 and 39 to eliminate the static electricity generated at these rollers.

Figure 8:
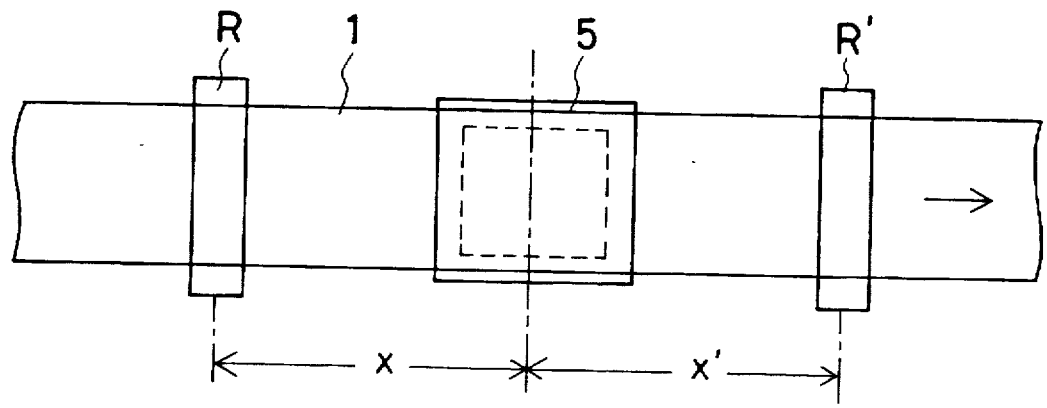
FIG. 8 shows the positions of nip rollers disposed in front of and behind an exposure position.

It should be noted that the distance x from each of the nip rollers 45 and 38 to the center line of the original plate 35 along the pass of the film 1 is set so as to satisfy the following relationship in accordance with the relationship shown in FIG. 8:

$$n(a+b)+a/2 < x < n(a+b)+a/2+b$$

where a is the dimension in the film longitudinal direction of a hologram recording region formed by a single duplicating process (i.e., the dimension of one frame), b is the spacing between each pair of adjacent hologram recording regions in the film longitudinal direction, and n is zero or a positive integer.

In order to enable the above relationship to be satisfied, the nip rollers 45 and 38 are arranged so that the position of each nip roller can be adjusted along the pass of the film 1.

In the above-described apparatus, the layer configurations of the photosensitive material film 1, the protective film 50 and the laminate of these films 1 and 50 at ①to ⑤ in FIG. 12(a) are such as those shown in FIGS. 12(b)①to 12(b)⑤. It should be noted that by peeling off the cover sheet 53 from the final product cut into a sheet, the duplicate hologram can be bonded to an article as a hologram seal.

The operation of laminating the photosensitive material 1 on the hologram original plate 35 and delaminating the former from the latter by the movement of the laminating and delaminating head 32 and the vertical movement of the hologram original plate 35 will be explained below more specifically with reference to FIGS. 13(1) to 15(12). The laminating and delaminating head 32 is provided with the peeling rollers 45 and a laminating and delaminating roller 46. By passing through the delaminating rollers 46, the duplicating photosensitive material film 1 is separated into the base film 3 and the stack of the photosensitive material 2 and the base film 4 (hereinafter referred to as "film ②"). The film ② is led to the guide roller 37 via the laminating and delaminating roller 46. The length of the film ② to that extends between the laminating and delaminating roller 46 and the guide roller 37 is laminated on the original plate 35, subjected to duplicating process, and then delaminated from the original plate 35. The laminating and delaminating head 32 is provided with a head horizontally moving mechanism (not shown) for moving the laminating and delaminating head 32 horizontally as viewed in the figures. The hologram original plate 35 is mounted on an original plate vertically moving mechanism (not shown).

First, as shown in FIG. 13(1), the original plate 35 is disposed at a lower position for laminating the film ② on the original plate 35, and the laminating and delaminating head 32 is moved to an upper right position which is off from the space directly above the original plate 35.

Next, as shown in FIG. 13(2), with both the film 1 and the film ② fixed (i.e., with the supply roller 31 and the take-up roller 43 fixed), the laminating and delaminating head 32 is moved leftwardly until the laminating and delaminating roller 46 has passed the right-hand edge of the original plate 35. At this time, the base film 3 is taken up at a speed double the speed of movement of the laminating and delaminating head 32.

Then, as shown in FIG. 13(3), in a state where the laminating and delaminating roller 46 has passed the right-hand edge of the original plate 35 to lie directly above the original plate 35, the original plate 35 is raised and pressed against the laminating and delaminating roller 46. With the laminating and delaminating roller 46 pressed in this way, the laminating and delaminating head 32 is continuously moved leftwardly to start laminating the film ② on the original plate 35.

As shown in FIG. 13(4), the laminating and delaminating head 32 is moved leftwardly until the laminating and delaminating roller 46 reaches a position immediately before the left-hand edge of the original plate 35, thereby completing the laminating of the film ② on the original plate 35.

Thereafter, as shown in FIG. 14(5), in a state where the laminating and delaminating roller 46 is at the position immediately before the left-hand edge of the original plate 35, the original plate 35 is lowered to separate the laminating and delaminating roller 46 from the original plate 35.

Figure 1A:
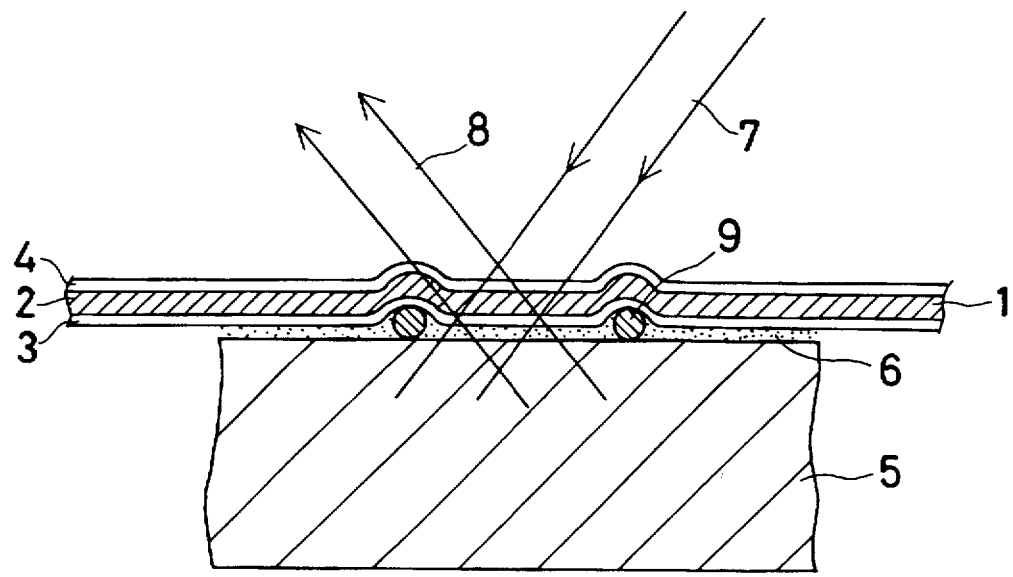
FIGS. 1(a) and 1(b) show the hologram duplicating method of the present invention.
Figure 1B:
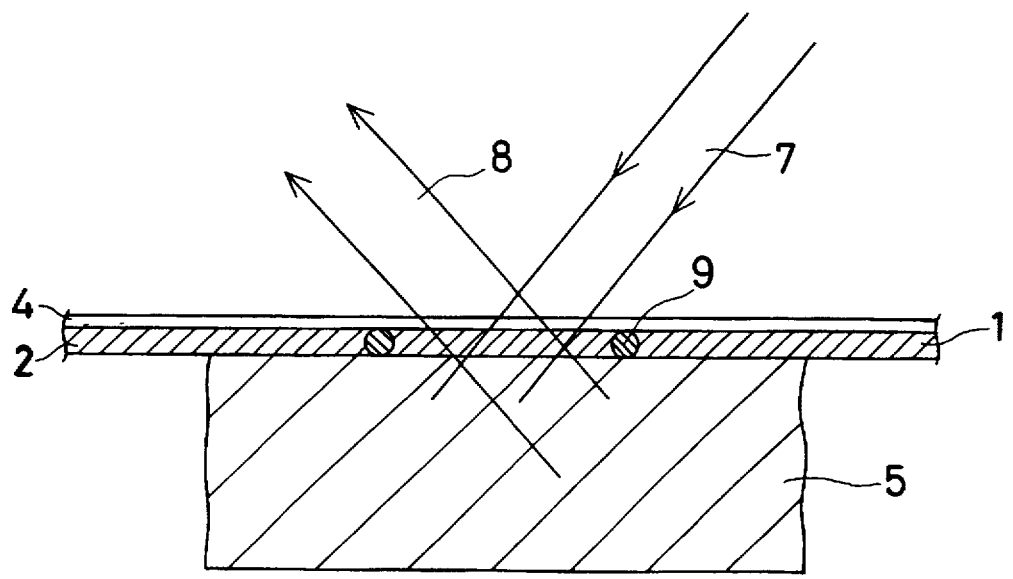
Figure 2A:
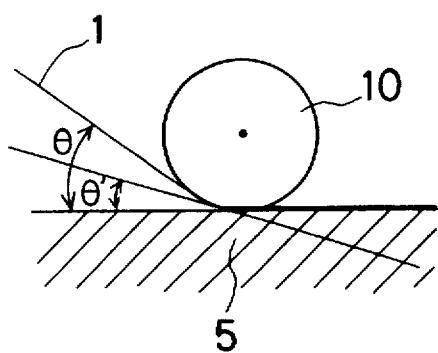
FIGS. 2(a) and 2(b) show a film laminating method according to the present invention.
Figure 2B:
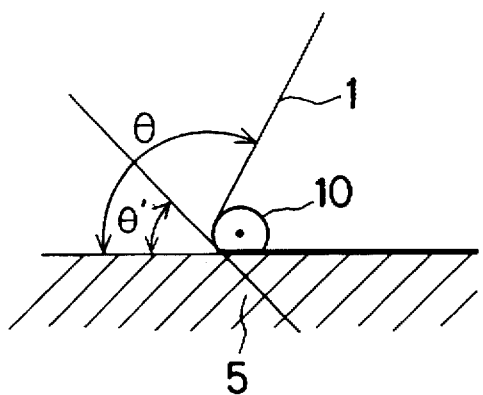
Figure 3A:
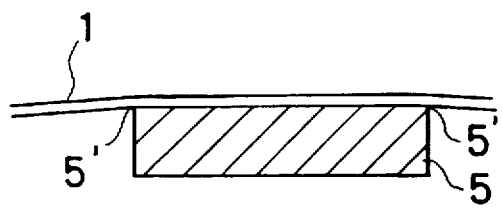
FIGS. 3(a) and 3(b) show the way in which a laminated film is damaged by edges of a hologram original plate, and also show a method of preventing the occurrence of such a problem.
Figure 3B:
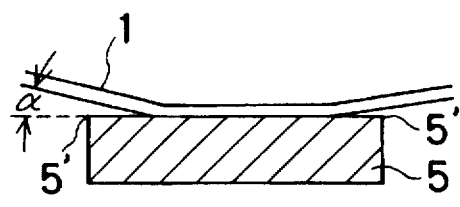
Figure 4A:
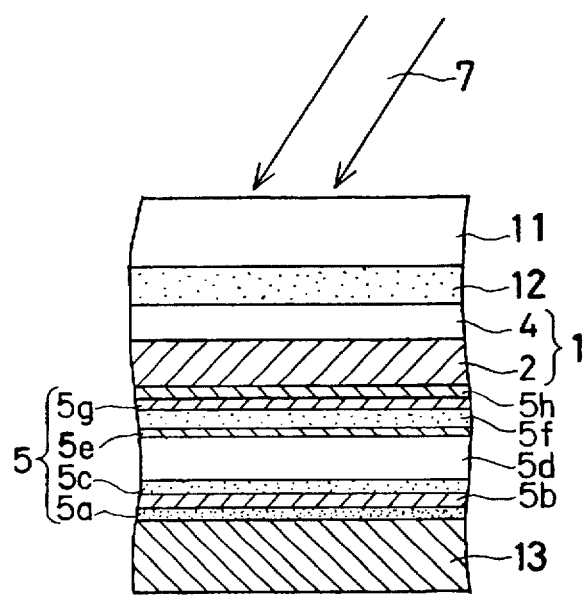
FIGS. 4(a) and 4(b) show layer configurations used for a hologram duplicating process.
Figure 4B:
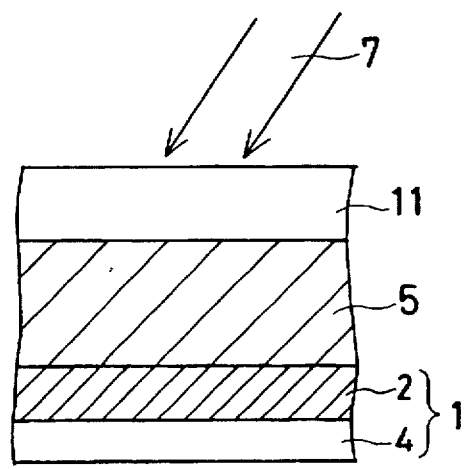
Figure 5A:
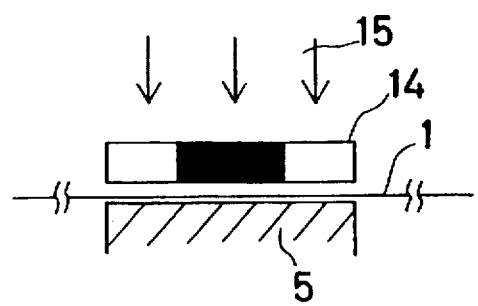
FIGS. 5(a) and 5(b) show trimming methods used in a hologram duplicating process.
Figure 5B:
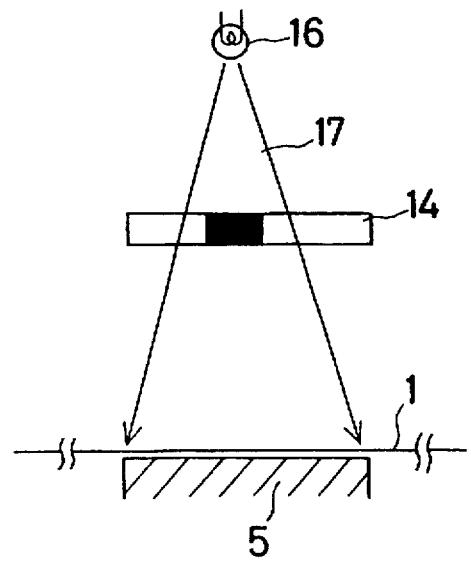
Figure 6A:
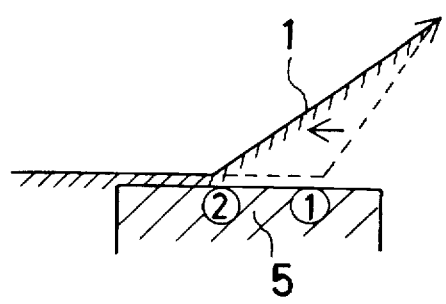
FIGS. 6(a) and 6(b) show a film delaminating method employed in the present invention.
Figure 6B:
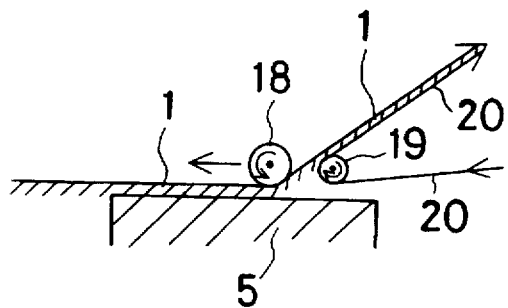

Thereafter, as shown in FIG. 14(6), the laminating and delaminating head 32 is further moved leftwardly to a left upper position which is off from the space directly above the original plate 35, and the movement of the laminating and delaminating head 32 is suspended when this position is reached. In this state, the film ② has been laminated not on the whole surface of the original plate 35 but on only the central region, exclusive of both ends of the original plate 35, as shown in FIG. 3(b). Thus, the two end portions of the film ②, which are not in contact with the original plate 35, are lifted and held a with small angle α with respect to the surface of the original plate 35. The angle α is set in the range of from about 2° to about 10°, as described above.

Next, at the step shown in FIG. 14(7), the antireflection coated glass 34 is placed on the film ② along with an index matching liquid to effect trimming and duplicating the original plate 35 by exposure, as described above. Then, the anti-reflection coated glass 34 is removed, and the index matching liquid is cleaned up and dried.

Thereafter, the film ② is delaminated from the original plate 35 by reversing the above-described procedure shown in FIGS. 13(1) to 14(6). That is, as shown in FIG. 14(8), the laminating and delaminating head 32 is moved rightwardly so that the laminating and delaminating roller 46 passes the left-hand edge of the original plate 35 to lie directly above the original plate 35. At this time, the film 1 and the film ② are left fixed, and the base film 3 is delivered at a speed double the speed of movement of the laminating and delaminating head 32.

Next, as shown in FIG. 14(9), in the above-described state, the original plate 35 is raised and pressed against the laminating and delaminating roller 46. Then, with the laminating and delaminating roller 46 pressed, the laminating and delaminating head 32 is continuously moved rightwardly to start delaminating the film ② from the original plate 35.

As shown in FIG. 15(10), the laminating and delaminating head 32 is moved rightwardly until the laminating and delaminating roller 46 reaches a position immediately before the right-hand edge of the original plate 35, thereby completing the delaminating of the film ② from the original plate 35.

Next, as shown in FIG. 15(11), in a state where the laminating and delaminating roller 46 is at the position immediately before the right-hand edge of the original plate 35, the original plate 35 is lowered to separate the laminating and delaminating roller 46 from the original plate 35.

Figure 7:
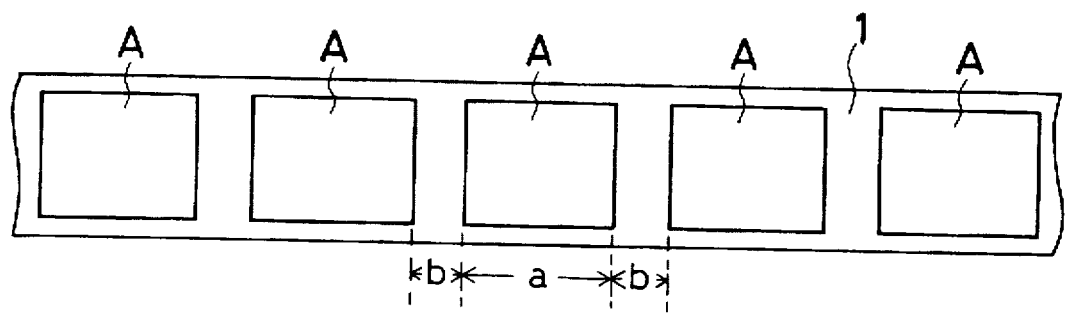
FIG. 7 shows the layout of hologram duplicating regions on a photosensitive material film produced by the present invention.

Finally, as shown in FIG. 15(12), the laminating and delaminating head 32 is further moved rightwardly to a right upper position which is off from the space directly above the original plate 35. The movement of the laminating and delaminating head 32 is suspended when the above-described position is reached. Then, in this state, the film 1 is delivered from the supply roller 31 by a length determined by adding the frame spacing to the dimension of one frame (i.e., (a+b) as shown in FIG. 7), and the base film 3 and the film ② are taken up by the respective take-up rollers 33 and 43 by the same length.

Then, the process returns to the step shown in FIG. 13(1) to carry out the next duplicating process.

In the foregoing, the process of laminating the duplicating photosensitive material film 1 on the hologram original plate 35 and delaminating the former from the latter has been explained. Next, a method whereby the anti-reflection coated glass 34 is placed on an index matching liquid, which is placed on the film 1 laminated on the original plate 35, without trapping bubbles will be explained in detail with reference to FIGS. 16(1) to 17(5).

As shown in FIG. 16(1), the anti-reflection coated glass 34 is provided with an anti-reflection coated glass vertically moving mechanism 66 for vertically moving the anti-reflection coated glass 34. More specifically, in the case of the illustrated example, rods 67 which can be vertically moved independently by air cylinders are provided in the four corners of the anti-reflection coated glass 34 through universal joints 68. When the duplicating photosensitive material film 1 [strictly speaking, the film 1 in the state shown in FIG. 12(b)②] is to be laminated on the original plate 35, the anti-reflection coated glass vertically moving mechanism 66 has been withdrawn from the original plate 35. Upon completion of the laminating of the film 1, the anti-reflection coated glass vertically moving mechanism 66 moves to a position over the surface of the original plate 35. In this state, the anti-reflection coated glass 34 is held in a raised position. Then, the index matching liquid supply pipe 63 is inserted sideways into the space above the original plate 35, and a proper quantity of index matching liquid 12 is dropped on the surface of the film 1 laminated on the original plate 35. Thereafter, the index matching liquid supply pipe 63 is withdrawn.

Next, as shown in FIG. 16(2), the anti-reflection coated glass vertically moving mechanism 66 is activated to lower the anti-reflection coated glass 34 slowly so that, first, only one corner of the anti-reflection coated glass 34 comes in contact with the laminated film 1. The index matching liquid has already been dropped on this portion of the film 1. The reason why the anti-reflection coated glass 34 is lowered in this way is that if the whole anti-reflection coated glass 34 is simultaneously lowered, air bubbles are trapped in the index matching liquid 12, causing duplicating defects.

Figure 17:
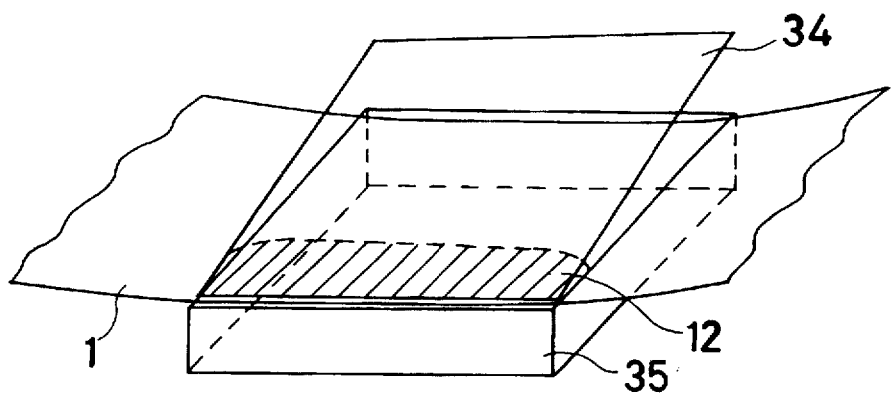
FIGS. 17(3) to 17(5) show steps subsequent to the steps shown in FIGS. 16(1) and 16(2).
Figure 17:
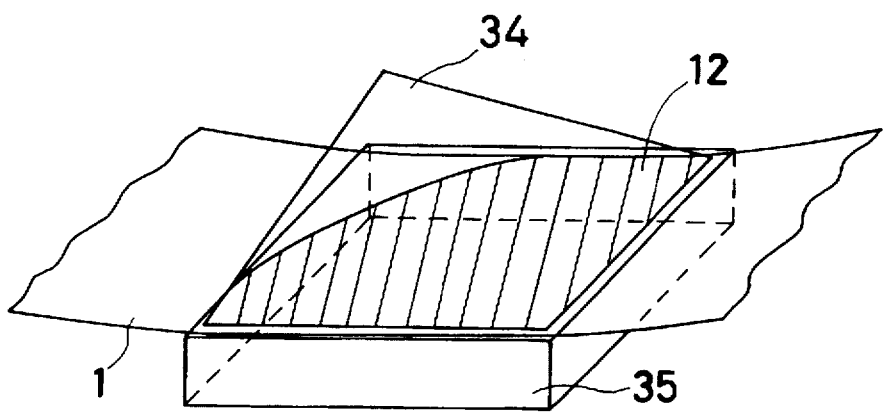
Figure 17:
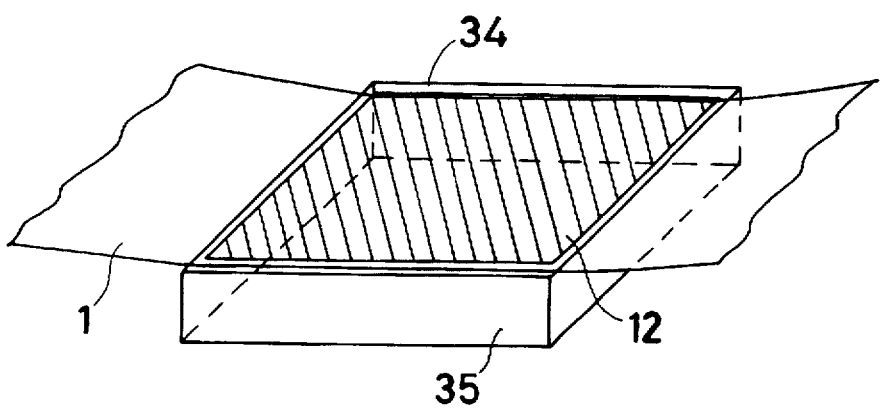

Next, as shown in FIG. 17(3), another corner of the anti-reflection coated glass 34 which is adjacent to the corner which has already been brought into contact with the film 1 is slowly lowered, thereby allowing the anti-reflection coated glass 34, which has been in contact with the film 1 at one point, to contact the film 1 at one side.

Thereafter, as shown in FIG. 17(4), one of the two corners of the anti-reflection coated glass 34 which have not yet been in contact with the film 1 is slowly lowered to come in contact with the film 1 in such a manner that the index matching liquid 12 is developed in the direction of width of the film 1. At this time, the anti-reflection coated glass 34 is deflected three-dimensionally. However, the deflection of the anti-reflection coated glass 34 required for the above-described purpose is so small as to be allowed by the elasticity of the anti-reflection coated glass 34 and that of the support frame therefor. Specifically, the deflection is about 1 mm to 2 mm for the anti-reflection coated glass 34 having a size of 300 mm×400 mm×5 mm.

Finally, as shown in FIG. 17(5), the remaining corner of the anti-reflection coated glass 34 is brought into contact with the film 1, thereby enabling the original plate 35, the film 1, the index matching liquid 12, and the anti-reflection coated glass 34 to be stacked in the mentioned order without trapping air bubbles, and thus completing a stack structure for duplicating exposure.

The hologram duplicating apparatus having the above-described arrangement enables favorable duplicate holograms to be continuously and efficiently produced without causing duplicating defects due to foreign matter such as dust particles and air bubbles and without peel unevenness.

[Embodiment 2]

Figure 18:
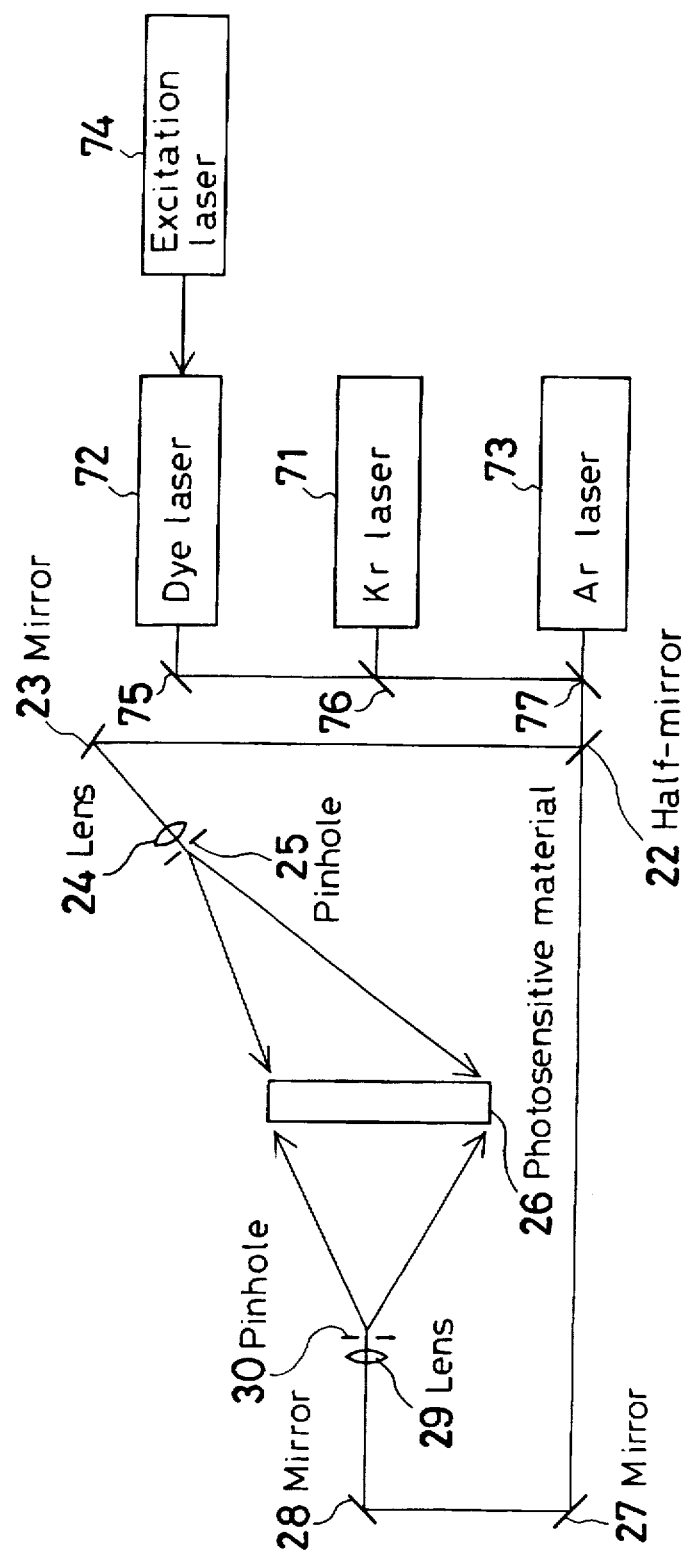
FIG. 18 shows the arrangement of a hologram original plate photographing optical system in another embodiment of the present invention.

A full-color Lippmann hologram (reflection hologram) original plate is produced by using an optical system such as that shown in FIG. 18. First, with the base film peeled off therefrom, Omnidex-705 holographic recording film, manufactured by Du Pont U.S.A., is laminated on a glass (original plate protective glass) of 1 mm in thickness. Thereafter, the base sheet is peeled off from the holographic recording film, and a PVA (polyvinyl alcohol) film (preferably, non-oriented film) of 5 µm in thickness is laminated on the exposed surface of the holographic recording film. The resulting stack structure is sandwiched between a pair of anti-reflection coated glasses through an index matching liquid (preferably, xylene), thereby preparing a holographic imaging plate (photosensitive material) 26. The photosensitive material 26 is set in the position illustrated in the figure. The optical system is approximately similar to that shown in FIG. 11. In the optical system shown in FIG. 18, however, three lasers are used in order to photograph a full-color hologram. That is, a Kr laser 71 (647 nm) is used as a light source for R. As a light source for G, a dye laser 72 (576 nm) with an Ar laser as an excitation laser 74 is used. In addition, an Ar laser 73 (458 nm) is used as a light source for B. A totally reflecting mirror 75 and dichroic mirrors 76 and 77 are used to propagate laser beams from these three light sources along one optical path. In the illustrated arrangement, the dichroic mirror 76 is a red narrow-band mirror having anti-reflection coating provided on the reverse surface thereof. The dichroic mirror 77 is a mirror that has anti-reflection coating provided on the reverse surface thereof and that selectively reflects only light of wavelength 500 nm or longer. However, the arrangements of the lasers 71 to 73 are not necessarily limited to the illustrated examples but may be changed as desired. In such a case, it is necessary to change the arrangement and reflection band of the totally reflecting mirror 75 and the dichroic mirrors 76 and 77.

With the above-described arrangement, first, a hologram is recorded by using only Kr laser light (647 nm). The exposure energy is 30 mJ/cm$^2$, and after the exposure process, uniform exposure is carried out at 100 mJ/cm$^2$ using a super-high pressure mercury lamp. Next, the two anti-reflection coated glasses are removed, and the index matching liquid is dried. Thereafter, Omnidex-705 and a PVA layer are successively stacked on the surface of the PVA film by the same method as the above, and the resulting stack structure is sandwiched between a pair of anti-reflection coated glasses again, thereby preparing a holographic imaging plate 26.

With the laser light changed to dye laser light (576 nm), uniform exposure is similarly carried out at 30 mJ/cm$^2$, and then uniform exposure is carried out using a super-high pressure mercury lamp. Further, the same process as the above is repeated. With the laser light changed to Ar laser light (458 nm), a third exposure is carried out. After the uniform exposure, the anti-reflection coated glasses are removed, and the index matching liquid is dried. Thereafter, an original plate substrate glass of 10 mm in thickness is bonded to the surface through an optical adhesive (NOA-61, manufactured by Noland U.S.A.).

Further, black spray [SSP spray black, manufactured by Atom Kagaku Toryo (k.k.)] is uniformly coated on the surface of the original plate substrate glass and then dried to form an antihalation layer. Further, the surface of the original plate protective glass is coated with a silicone-containing releasing agent |KE42TS', manufactured by Shinetsu Chemical (k.k.)| to form a release layer, thereby preparing an original plate 35 to be duplicated.

Further, as shown in FIG. 9(b), the surface of the hologram original plate 35 |5 in FIG. 9(b)| with which the duplicating photosensitive material film is to be brought into close contact is provided with grooves 61 along two edges extending in the film longitudinal direction, and embankments 62 are formed between the two edges of the original plate 35 (5) and the grooves 61.

Next, the hologram original plate 35 is incorporated into a duplicating apparatus such as that shown in FIG. 12(a). In this apparatus, as the duplicating photosensitive material film 1, Omnidex-705 holographic recording film having a triple-layer configuration which is composed of a base film 3, a photosensitive material 2 and a base film 4, as shown in the sectional view of FIG. 12(b)①, is used. As a protective film 50, a protective film which is composed, as shown in the sectional view of FIG. 12(b)③, of a PET (polyethylene terephthalate) 51 of 50 μm in thickness, an optical adhesive (NOA-61, manufactured by Noland U.S.A.) 52 of 1 μm in thickness, and a PET 53 of 50 μm in thickness is used.

The arrangement of the duplicating apparatus together with the function thereof, will be explained below. A supply roller 31 has the duplicating photosensitive material film 1 set thereon. The film 1 is delivered from the supply roller 31 and cleaned through a cleaning unit 44 which is composed of gum rollers. Then, the base film 3 is peeled off from one side of the film 1 by peeling rollers 45 in a laminating and delaminating head 32. The peeled base film 3 is taken up by a take-up roller 33. Meanwhile, the film 1 having the photosensitive material surface exposed is laminated on the central region of the glass plate constituting the hologram original plate 35 by the movement of the laminating and delaminating head 32 from the right toward the left as viewed in the figure and the vertical movement of the hologram original plate 35, as described in connection with FIGS. 13(1) to 15(12). At this time, the stop position of the laminating and delaminating head 32, the lifting timing of the hologram original plate 35 and the position of a guide roller 37 are set so that the lift angle α [FIG. 3(b)] of the duplicating photosensitive material film 1 at each end of the original plate 35 is in the range of from about 2° to about 10°.

Next, barrier members 60 such as those shown in FIGS. 9(a) and 9(c) are inserted sideways into the space above the original plate 35 with the film 1 laminated thereon and lightly pressed on portions of the film 1 which are in close contact with the original plate 35 (5) at respective positions which are near the two ends thereof and outside the effective duplicating region. Then, an index matching liquid supply pipe 63 such as that shown in FIG. 9(c), whose distal end is branched into two or more branches and which is capable of simultaneously dropping an index matching liquid from a plurality of holes, is advanced sideways into the space above the original plate 35, and a proper quantity of xylene as an index matching liquid is dropped onto the film 1 laminated on the original plate 35. Thereafter, the index matching liquid supply pipe 63 is withdrawn, and an anti-reflection coated glass 34 is carefully placed on the layer of index matching liquid so that no bubbles are trapped, as described in connection with FIGS. 16(1) to 17(5). It should be noted that the surface of the anti-reflection coated glass 34 which is to come in contact with the index matching liquid is previously subjected to repellent treatment using a fluorine-containing repellent, a silicone-containing repellent, etc.

Thereafter, projection exposure is carried out by applying ultraviolet light 48 from a super-high pressure mercury lamp (not shown) through a chromium trimming mask 36, thereby shielding only the central portion of the laminate region of the photosensitive material 2, and exposing the peripheral portion, exclusive of the central portion, at a dose rate of 30 mJ/cm$^2$, and thus making the peripheral portion lose its photosensitivity. In this way, trimming (masking) is carried out.

Next, Ar laser light, Kr laser light and dye laser light 47, which are in conjugate relation to the laser light used in the original plate photographing process, are successively applied to the original plate 35 from the film side (dose rate: 30 mJ/cm$^2$) to effect duplication.

After the above-described exposure process, the anti-reflection coated glass 34 is removed from the film 1.

Meanwhile, the squeegee (wiper) 64 which is concavely (arcuately) curved in the wiping direction shown by the arrow in FIG. 10 is inserted and lightly pressed on the film 1 to wipe the surface of the film 1 in the direction of the arrow, thereby cleaning up the index matching liquid. The index matching liquid that still remains is dried by heated air.

Next, the photosensitive material film 1 is peeled off and the film 1 is fed by a length determined by adding the frame spacing to the dimension of one frame by the movement of the laminating and delaminating head 32 from the left toward the right as viewed in the figure and the vertical movement of the hologram original plate 35, as described in connection with FIGS. 13(1) to 15(12). At this time, a protective film 50 with an adhesive layer 52 is laminated on the photosensitive material side of the photosensitive material film 1 by laminating rollers 38. At this time, the cover sheet 51 (PET of 50 μm in thickness) of the protective film 50 supplied from a supply roller 40 is peeled off by peeling rollers 39 and taken up by a take-up roller 41.

The photosensitive material film 1 having the protective film 50 laminated thereon enters an ultraviolet irradiator 42 where it is exposed to ultraviolet light from a super-high pressure mercury lamp at 100 mJ/cm$^2$, and thereafter the photosensitive material film 1 is taken up by take-up roller 43. The exposure by the use of ultraviolet light is a treatment for enhancing the adhesion of the adhesive layer 52. It should be noted that an antistatic device is provided for each of the peeling rollers 45 and 39 to eliminate the static electricity generated at these rollers.

It should be noted that the distance x from the center line of the original plate 35 to each of the nip rollers 45 and 38 along the pass of the film 1 is set so as to satisfy the following relationship in accordance with the relationship shown in FIG. 8:

$$n(a+b)+a/2 < x < n(a+b)+a/2+b$$

where a is the dimension in the film longitudinal direction of a hologram recording region formed by a single duplicating process (i.e., the dimension of one frame), b is the spacing between each pair of adjacent hologram recording regions in the film longitudinal direction, and n is zero or a positive integer.

In order to enable the above relationship to be satisfied, the nip rollers 45 and 38 are arranged so that the position of each nip roller can be adjusted along the pass of the film 1.

In the above-described apparatus, the layer configurations of the photosensitive material film 1, the protective film 50 and the laminate of these films 1 and 50 at ① to ⑤ in FIG. 12(a) are such as those shown in FIGS. 12(b)① to 12(b)⑤. It should be noted that by peeling off the cover sheet 53 from the final product cut into a sheet, the duplicate hologram can be bonded to an article as a hologram seal.

Although the hologram duplicating method, hologram duplicating apparatus and duplicate hologram of the present invention have been described above by way of some embodiments, it should be noted that the present invention is not necessarily limited to these embodiments, and that various changes and modifications may be imparted thereto.

As will be clear from the foregoing description, according to the hologram duplicating method, hologram duplicating apparatus and duplicate hologram of the present invention, a photosensitive material film, which is composed of a photosensitive material sandwiched between a pair of base films, is supplied, and while doing so, the base film is peeled off from one side thereof, and the photosensitive material film is successively laminated on a hologram original plate to be duplicated with the exposed photosensitive material surface facing toward the hologram original plate while the photosensitive material film is being squeezed with a roller from the side opposite to the exposed side. Then, light is applied from the photosensitive material film side or from the side opposite thereto. Thereafter, the photosensitive material film laminated on the hologram original plate is successively delaminated from one end thereof with the photosensitive material film being pressed with a roller, and a protective film is successively laminated on the exposed photosensitive material surface of the delaminated photosensitive material film. Thereafter, the photosensitive material film is taken up. Therefore, no air bubbles are trapped when the film is laminated on the original plate, and no peel unevenness, e.g., undesired line, occurs when the film is peeled off from the original plate.

What we claim is:

1. A hologram duplicating method, wherein a photosensitive material film is brought into close contact with a hologram original plate and light is applied to said film, said method comprising the steps of:

preparing a photosensitive material film comprising a photosensitive material and two base films, wherein one base film is attached to each side of said photosensitive material;

peeling the base film from one side of the photosensitive material, exposing a surface of said photosensitive material, while supplying the photosensitive material film;

continuously laminating the photosensitive material film on a surface of said hologram original plate, such that upon initial contact between said photosensitive film and said original plate, said hologram original plate becomes laminated with said photosensitive material film a portion at a times, with the exposed photosensitive material surface facing the hologram original plate while pressing the photosensitive material film onto said original plate with a roller of a predetermined diameter from a side opposite to the exposed side to prevent air bubbles from being formed between said original plate and said film;

applying light to the film and plate;

continuously delaminating the photosensitive material film from the hologram original plate by peeling off the film from said original plate at a substantially even rate, with the photosensitive material film being braced against said original plate with a roller of a predetermined diameter on an upper surface of said photosensitive film to prevent a crease from forming on the film due to an uneven peel rate;

continuously laminating a protective film on the exposed photosensitive material surface of the delaminated photosensitive material film a portion at a time; and taking up the photosensitive material film.

2. A hologram duplicating method according to claim 1, wherein said hologram original plate is comprises a predetermined number of a releasing agent layer, a cover glass, an adhesive layer, a hologram layer, a light-absorbing layer, an adhesive layer, a substrate, and a light-absorbing layer, which are stacked in the mentioned order.

3. A hologram duplicating method according to claim 1, wherein said hologram original plate has a hologram layer comprising:

a plurality of optical layers having at least one of:
   different wavelength characteristics and different angles of diffraction;
   and barrier layers provided between said optical layers and between the hologram layer and layers overlying and underlying said hologram layer.

4. A hologram duplicating method according to claim 1, wherein said photosensitive material film having the base film peeled off from one side thereof is laminated, while being pressed with the roller, on only a central region of the hologram original plate, exclusive of two edges of the hologram original plate at both ends in the roller pressing direction.

5. A hologram duplicating method according to claim 4, wherein said photosensitive material film at both ends in the roller pressing direction which are not in contact with said hologram original plate are lifted and held at a small angle with respect to the surface of said original plate.

6. A hologram duplicating method according to claim 5, wherein said small angle formed by said photosensitive material film and said original plate satisfies the expression: $\alpha < \sin^{-1}(f/F)$, where $\alpha$ represents said small angle, F is adhesion of the film to said plate, and f is the tension of the film.

7. A hologram duplicating method according to claim 6, wherein $\alpha$ is set in a range 2°–10° as measured from a laminated surface of the hologram originally plate.

8. A hologram duplicating method according to claim 6, wherein the tension of the film is at least 0.1 kgf/cm.

9. A hologram duplicating method according to claim 1, wherein said photosensitive material film is of continuous length and comprises a plurality of duplicating frames having a dimension a, and at least one nip roller is disposed in front of or behind a duplicating position to intermittently feed said film onto said original plate a length of said film determined by adding a distance b between each adjacent frame, said nip roller being disposed so that a distance x from a center line of said original plate to said nip roller in the longitudinal direction of the film satisfies the following relationship:

$$n(a+b)+a/2 < x < n(a+b)+a/2+b$$

where n is zero or a positive integer.

10. A hologram method according to claim 1, wherein said original hologram plate is comprises of a predetermined number of a releasing agent layer, a cover glass, an adhesive layer, a hologram layer, and adhesive layer, and a coated glass, which are stacked in the mentioned order.

11. A hologram duplicating method according to claim 1, wherein the roller has a predetermined diameter of 100 mm or less.

12. A hologram duplicating apparatus for duplicating a hologram from a hologram original plate comprising:

a film supply means for supplying a photosensitive material film comprising a photosensitive material and a pair of base films, one base film attached to each side of the photosensitive material;

a base film peeling means for peeling one of said base films from one side of said photosensitive material film supplied from said film supply means;

a film laminating means for continuously laminating said photosensitive material film on a surface of said hologram original plate, such that upon initial contact between said photosensitive film and said original plate, said hologram original plate becomes laminated with said photosensitive material film a portion at a time, said film being laminated with the exposed photosensitive material surface facing said hologram original plate while being pressed with a roller of a predetermined diameter to prevent air bubbles from being formed between said original plate and said film;

an optical hologram duplicating means for duplicating a hologram image of said hologram original plate onto said photosensitive material film, which is laminated on said hologram original plate;

a film delaminating means for continuously delaminating said photosensitive material film from said hologram original plate by peeling off the film from said original plate at a substantially even rate, while bracing said photosensitive material film against said original plate with a roller of a predetermined diameter on an upper surface of said photosensitive film to prevent a crease from forming on the film due to an uneven peel rate;

a protective film laminating means for laminating a protective film on the exposed photosensitive material surface of said photosensitive material film delaminated from said hologram original plate; and a film take-up means for taking up said photosensitive material film having said protective film laminated thereon.

13. A hologram duplicating apparatus according to claim 12, wherein the roller in said film laminating means also serves as the roller in said film delaminating means.

14. A hologram duplicating apparatus according to claim 12, wherein said hologram original plate comprises a predetermined number of a releasing agent layer, a cover glass, an adhesive layer, a hologram layer, a light-absorbing layer, an adhesive layer, a substrate, and a light-absorbing layer, which are stacked in the mentioned order.

15. A hologram duplicating apparatus according to claim 12, wherein said hologram original plate has a hologram layer comprising:

a plurality of optical layers having at least one of: different wavelength characteristics and different angles of diffraction;

and barrier layers provided between said optical layers and between the hologram layer and layers overlying and underlying said hologram layer.

16. A hologram duplicating apparatus according to claim 12, further comprising at least one of a cleaning gum roller for removing foreign matter from said photosensitive material film supplied from said film supply part, and a static eliminator for preventing adhesion of foreign to said film by static electricity.

17. A hologram duplicating apparatus according to claim 12, further comprising a trimming means for irradiating a part of said photosensitive material film with energy to which said film is sensitive, at the same time as or before the optical duplicating process is carried out in said optical hologram duplicating means, thereby making said photosensitive material film lose its photosensitivity in the part of the film to which irradiation is applied.

18. A hologram duplicating apparatus according to claim 12, further comprising a uniform exposure means for reducing adhesion of said photosensitive material film to said hologram original plate after the optical duplicating process has been carried out in said optical hologram duplicating means.

19. A hologram duplicating apparatus according to claim 12, wherein said protective film has an adhesive layer on one side thereof, and in said protective film laminating means said protective film is laminated on said photosensitive material film with the adhesive layer facing the exposed photosensitive material surface of said photosensitive material film delaminated from said hologram original plate.

20. A hologram duplicating apparatus according to claim 12, further comprising an ionizing radiation irradiator for applying an ionizing radiation to said protective film, said ionizing radiation irradiator being disposed between said protective film laminating means and said film take-up means.

21. A hologram duplicating apparatus according to claim 12, further comprising a spreading means for spreading an index matching liquid over the surface of said photosensitive material film after said photosensitive material film has been laminated on said hologram original plate by said film laminating means, and a stacking means for stacking a transparent member on the developed index matching liquid.

22. A hologram duplicating apparatus according to claim 21, wherein said spreading means has index matching liquid supply means having at least two outlet ports.

23. A hologram duplicating apparatus according to claim 21 or 22, further comprising: a barrier means for containing the index matching liquid spread over the surface of said photosensitive material film within a predetermined portion of said film.

24. A hologram duplicating apparatus according to claim 21, wherein said stacking means has a control means for controlling lowering of said transparent member onto the surface of said photosensitive material film so that said transparent member comes in contact with the surface of said photosensitive material film in the following sequence: contact at one point, contact at one side, contact at two sides, and contact at the whole surface.

25. A hologram duplicating apparatus according to claim 21, further comprising a removal means for removing the index matching liquid remaining on the surface of said photosensitive material film before said photosensitive material film is delaminated from said hologram original plate by said film delaminating means.

26. A hologram duplicating apparatus according to claim 25, further comprising a drying means for drying said photosensitive material film after the removal of the index matching liquid by said removal means.

27. A hologram duplicating apparatus according to claim 12, wherein said hologram original plate comprises a predetermined number of a releasing agent layer, a cover glass, an adhesive layer, a hologram layer, and adhesive layer, and a coated glass, which are stacked in the mentioned order.

28. A hologram duplicating apparatus according to claim 12, wherein the roller has a predetermined diameter of 100 mm or less.

29. A hologram duplicating method, wherein a photosensitive material film is brought into close contact with a hologram original plate and light is applied to said film, said method comprising the steps of:

preparing a photosensitive material film comprising a photosensitive material and two base films, one base film attached to each side of said photosensitive material;

peeling the base film from one side of the photosensitive material, exposing a surface of said photosensitive material, while supplying the photosensitive material film;

continuously laminating the photosensitive material film on a surface of said hologram original plate, such that upon initial contact between said photosensitive film and said original plate, said hologram original plate becomes laminated with said photosensitive material film a portion at a time with the exposed photosensitive material surface facing the hologram original plate while pressing the photosensitive material film onto said original plate with a roller of a predetermined diameter from a side opposite to the exposed side to prevent air bubbles from being formed between said original plate and said film;

spreading an index matching liquid to an upper surface of said photosensitive material film;

placing a transparent medium over said index matching liquid in a manner to prevent gas bubbles from forming between said film and said medium;

applying light to the film and plate;

continuously delaminating the photosensitive material film from the hologram original plate by peeling off the film from the original plate at a substantially even rate, with the photosensitive material film being braced against said hologram original plate with a roller of a predetermined diameter on an upper surface of said photosensitive film to prevent a crease from forming on the film due to an uneven peel rate;

continuously laminating a protective film on the exposed photosensitive material surface of the delaminated photosensitive material film a portion at a time; and taking up the photosensitive material film.

30. A hologram duplicating method according to claim 29, wherein said hologram original plate comprises a predetermined number of a releasing agent layer, a cover glass, an adhesive layer, a hologram layer, a light-absorbing layer, an adhesive layer, a substrate, and a light-absorbing layer, which are stacked in the mentioned order, wherein a surface of said original hologram plate which is most proximal to said photosensitive material film has grooves near the edges of said plate running in the direction in which said film is laminated on said plate.

31. A hologram method according to claim 29, wherein said hologram original plate comprises a predetermined number of a releasing agent layer, a cover glass, an adhesive layer, a hologram layer, and adhesive layer, and a coated glass, which are stacked in the mentioned order wherein a surface of said original hologram plate which is most proximal to said photosensitive material film has grooves near the edges of said plate running.in the direction in which said film is laminated on said plate.

* * * * *